US005523848A

United States Patent [19]

Musso et al.

[11] Patent Number: 5,523,848

[45] Date of Patent: Jun. 4, 1996

[54] INK JET PRINTING DEVICE AND PLAIN PAPER FACSIMILE APPARATUS USING THE SAME

[75] Inventors: Pietro Musso, Ivrea; Paolo Rivera, Strambino, both of Italy

[73] Assignee: Ing. C. Olivetti & C., S.p.A., Ivrea, Italy

[21] Appl. No.: 76,798

[22] Filed: Jun. 15, 1993

[30] Foreign Application Priority Data

Jun. 15, 1992 [IT] Italy ................................ TO92A0509

[51] Int. Cl.[6] .............................. H04N 1/23; H04N 1/04; B41J 3/00; B41J 11/58

[52] U.S. Cl. ............................ 358/296; 358/498; 347/4; 347/104; 400/625

[58] Field of Search .................................... 358/296, 400, 358/401, 471, 474, 488, 496, 498, 502, 526; 347/3, 4, 104, 105, 108; 346/24; 400/578, 582, 605, 608.2, 608.4, 610.2, 625, 636, 637.1; 271/3, 8.1, 9, 84, 205, 264, 265, 306

[56] References Cited

U.S. PATENT DOCUMENTS

| | | | |
|---|---|---|---|
| 4,673,285 | 6/1987 | Shogren . | |
| 5,166,707 | 11/1992 | Watanabe et al. | 358/296 X |
| 5,244,294 | 9/1993 | Ewing | 400/625 |
| 5,248,210 | 9/1993 | Schulz | 400/625 |
| 5,373,368 | 12/1994 | Taniguro | 358/296 |

FOREIGN PATENT DOCUMENTS

| | | | |
|---|---|---|---|
| 0038215 | 10/1981 | European Pat. Off. | B41J 35/10 |
| 4108467A1 | 9/1991 | Germany | H04N 1/04 |

*Primary Examiner*—Peter S. Wong
*Assistant Examiner*—Eric Frahm
*Attorney, Agent, or Firm*—Banner & Allegretti, Ltd.

[57] ABSTRACT

The printing device has, in addition to a line feeding device mounted upstream of the printing line to make the sheet advance incrementally, an extraction mechanism mounted downstream of the printing line in order to enable printing without smudging until the trailing edge of the sheet; the extraction mechanism including a couple of robber rollers and opposed pressure rollers having fine external teeth, which are selectively engaged, when the trailing edge of the sheet reaches a determined position, by means of cam driven levers.

3 Claims, 18 Drawing Sheets

31
42
43
46
37
49
50
63
81
73
84
90
264
266
149
57
58
111
56
54
76
74
102
103
51
107
36
47
32
34
33
53
48

264
63
81
47
90
84
63
66
57
58
82
43
42
39
56
111
74
54
102
103
107
51
36
37
34
47
49
53
41
32
33
46
48

63
50
234
64
67
36
34
64
62
61
66
193
192
57
186
57
89
85
80
88
56
54
39
90
101
103
101
103
51
51
41
33
49
37

62
126
128
61
168
208
87
217
67
221
33
227
224
229
222
211
209
82
196
56
57
127
131
132
58
89
59
193
85
186
191
189
188
109
187
52
54
39

62
67
217
221
33
224
217
87
227
229
168
208
126
209
211
222
82
56
57
196
193
127
85
186
191
131
132
58
189
189
59
188
52
109
187
39
54

66
84
151
152
216
154
86
199
153
8
9
12
11
201
141
10
218
33
202
216
223
226
204
83
233
168
228
219
231
206
197
198
207
127
194
192
88
85
186
82
52

64
66
84
151
152
216
154
86
153
11
10
199
201
9
12
141
218
33
202
8
223
216
226
228
83
233
168
206
197
198
207
219
127
194
192
88
80
82
186
52

63
50
67
67
32
206
217
221
224
207
217
168
209
211
36
222
193
191
186
89
85
50
189
189
188
109
187

142
84
151
152
156
73
144
143
141
146
139
149
148
33
193
174
168
57
58
169
133
137
179
138
147
178
181
136
68
176
54

57

157
153
161
162
163
141
168
136
58
54
166
169
164
159
71
120
134
171
172
173
177
183
184
174

163
153
161
159
169
141
168
136
58
166
54
120
71
134
162
171

177
183
184
174
173

84
142
151
152
156
146
154
138
141
144
143
168
174
184
57
34
120
72
181
71
69

54
136
71
120
69
72
137
182
184
134
181
147

136
136
54

54
120
69
71
72
137
182
184
134
174
181
147

FIG. 21
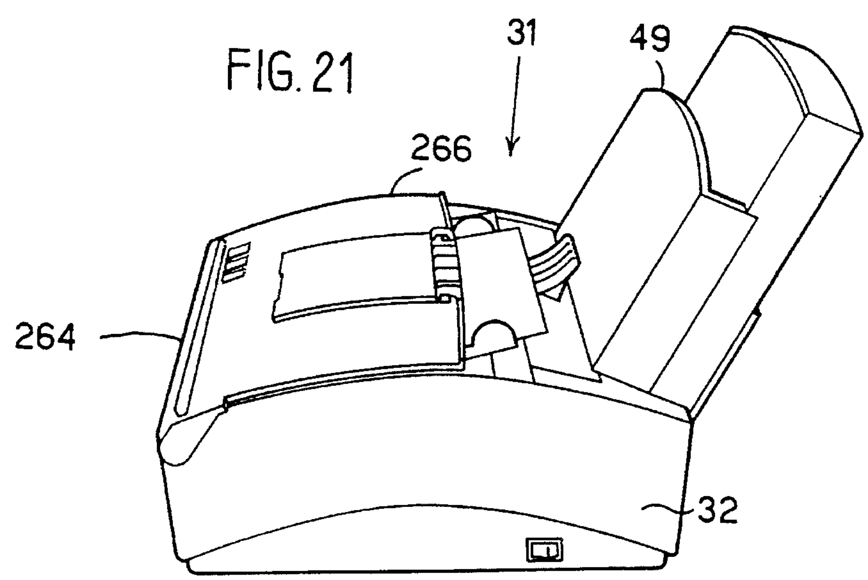
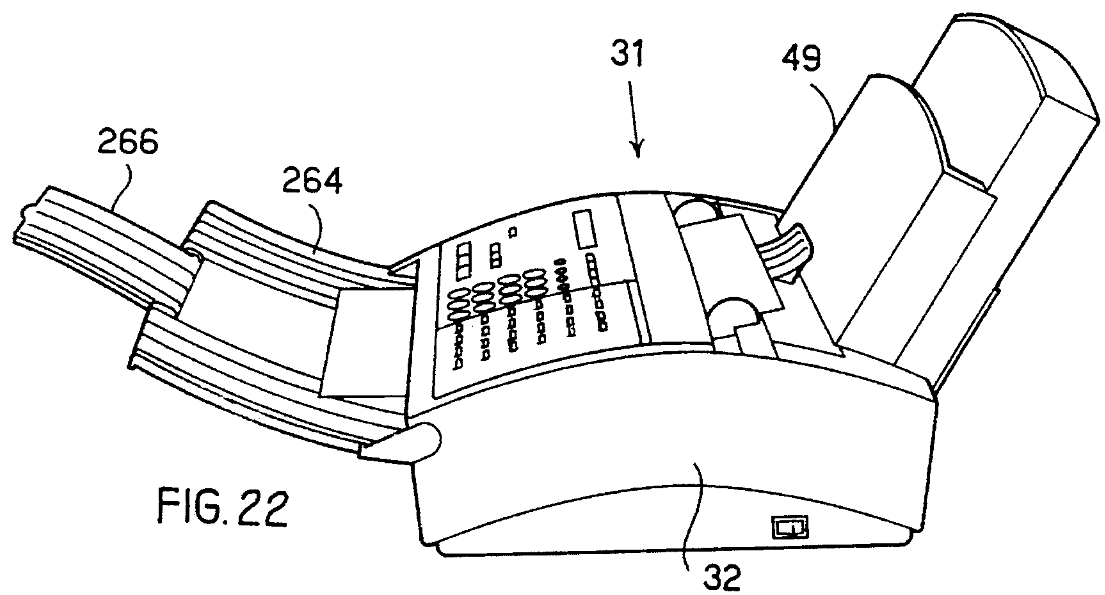
FIG. 22

INK JET PRINTING DEVICE AND PLAIN PAPER FACSIMILE APPARATUS USING THE SAME

BACKGROUND OF THE INVENTION

I. Field of the invention

The present invention relates to a facsimile machine for printing on single sheets, comprising an ink-jet printing head which is movable along a printing line and may be activated to print on a copy sheet, and a line feed device mounted upstream of the printing line to make each sheet advance in front of the printing line.

II. Related Art

Facsimile machines with ink-jet printing devices are very advantageous because of the high print quality which may be obtained, the low cost of the sheets of ordinary paper used for the copies, and the unalterability of the copies. These machines have technical problems, of which some problems relate to the adaptation of the ink-jet device to the facsimile, while other problems are also common in ink-jet printers in general use. In the case of a facsimile, the problems of the printers are more serious, owing to the constraints of size, cost and reliability which are typical of facsimile machines.

The ink-jet heads form printing lines consisting of minuscule ink droplets which remain wet for a few seconds after they have been fixed to the copy sheet. The advance of the single sheet is effected by gripping parts of the line feed device which engage the two sides of a sheet to draw it in front of the head to a collecting station. The gripping parts are necessarily disposed upstream of the printing line to prevent them from coming into contact with the ink which is still wet, which would cause the lines to smudge and would cause staining of other parts of the copy sheet. This arrangement prevents the sheet from being advanced incrementally in the section in the space between the printing line and the gripping parts of the advance device. This makes it impossible to form lines of print adjacent to the trailing edge of the single sheet.

A technical problem of the present invention is that of providing a facsimile machine for single sheets with an ink-jet head, in which it is possible to form printing lines adjacent to the trailing edge of a single sheet.

The printing devices used in facsimile machines are generally derived from printing mechanisms for general use. In these printing mechanisms, in order to avoid smudges and stains due to the still-wet ink in the course of printing, the single sheets are collected by a copy holding frame which is opened only after the whole sheet has been completely printed. The sheet may thus be laid on top of the other previously printed sheets in the collecting station without any sliding of the non-printed side of the last sheet with respect to the printed side of the penultimate sheet.

In a known printer, the frame is opened by substantially vertical control levers by the side of the collecting station. This structure produces a printing mechanism which is rather high, and this is not acceptable in a facsimile machine of the compact type.

The printing head comprises ink ejection nozzles which are kept free from obstructions in a cleaning station controlled by suitable activation means. This station also generally provides a protective cap for the ejection nozzles, cap displacement means which may be activated to make the cap adhere to the needles, and a pump to apply a reduced pressure to the needles and suck ink residues from the protective cap.

In facsimile machines or ink-jet printers of the known type, independent means are provided for the control of the opening of the copy holding frame, and for the activation of the cleaning station, including the control of the cap displacement and the pump actuation. This makes the machine expensive.

SUMMARY OF THE INVENTION

The invention in its various aspects is defined in the independent claims appended to this description to which reference should now be made. Advantageous features of the invention are set forth in the appendant claims.

A preferred embodiment of the invention is described in more detail below which overcomes the various problems and disadvantages noted above. The preferred facsimile machine for single sheets embodying the invention comprises an ink-jet printing head and a line feed device mounted upstream of the printing line to make the sheet advance incrementally. An extraction mechanism is provided, having driven rollers which may be activated from a state of disengagement with a partially printed sheet to a state of engagement with the sheet. The sheet is drawn forward sufficiently to enable the head to print lines adjacent to the trailing edge. The extraction mechanism is actuated when a given reference position of the sheet with respect to the head is detected. A single service motor and suitable cam means drive the special mechanisms of the machine.

BRIEF DESCRIPTION OF THE DRAWINGS

These and other characteristics will be clearly understood from the following description, which refers to a preferred embodiment of the invention provided by way of example but without restriction, and with reference to the attached drawings, in which:

FIG. 21 is a perspective side view of other details of the machine shown in FIG. 1, on a different scale; and FIG. 22 is a perspective side view of the details shown in FIG. 21, in an operating position.

DETAILED DESCRIPTION OF THE PREFERRED EMBODIMENTS

GENERAL DESCRIPTION

Figure 1:
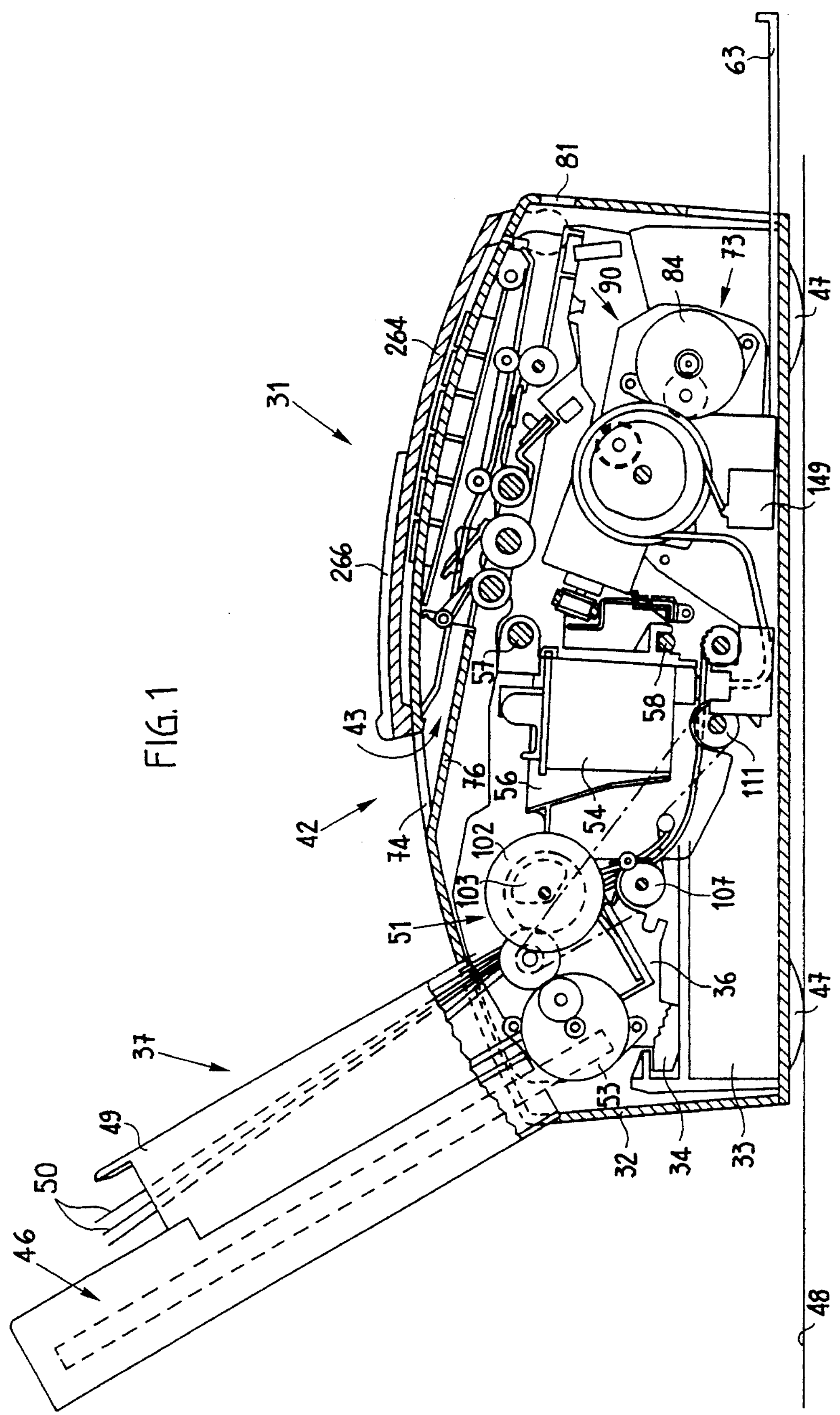
FIG. 1 is a partial longitudinal view of a facsimile machine embodying the invention.
Figure 2:
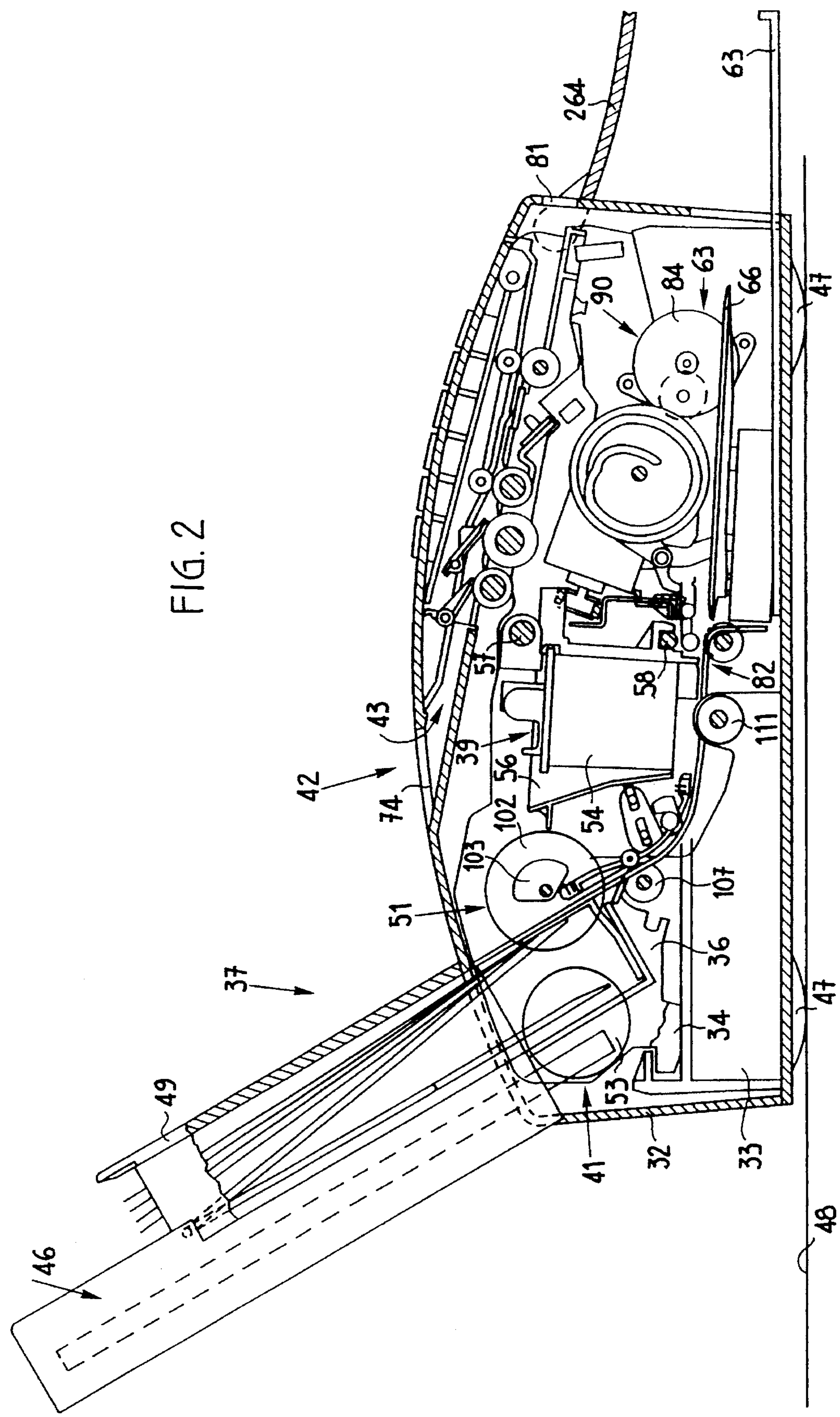
FIG. 2 is a partial longitudinal view of other details of the facsimile machine shown in FIG. 1.
Figure 3:
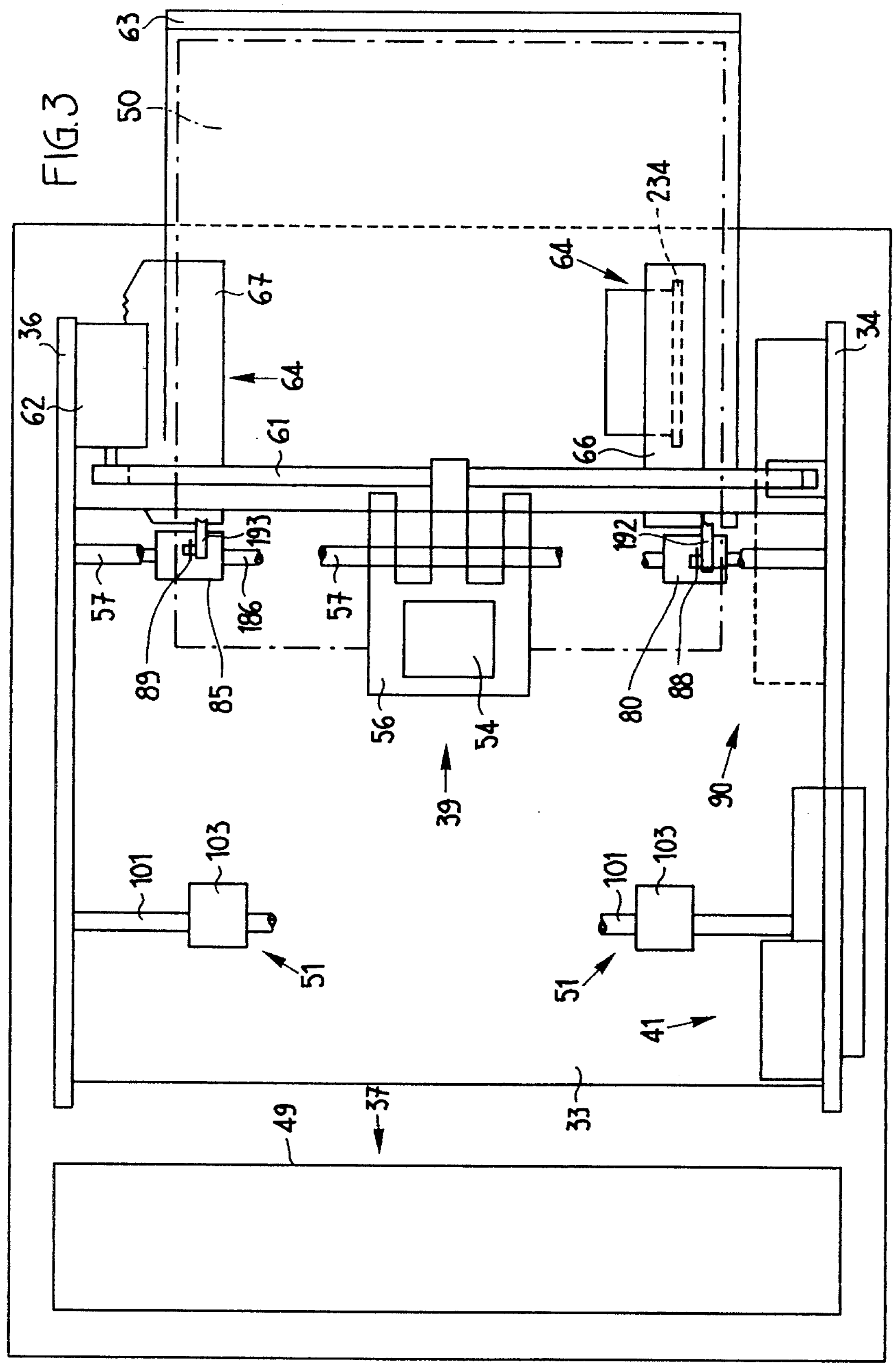
FIG. 3 is a schematic plan view of certain details of FIG. 1.
Figure 4:
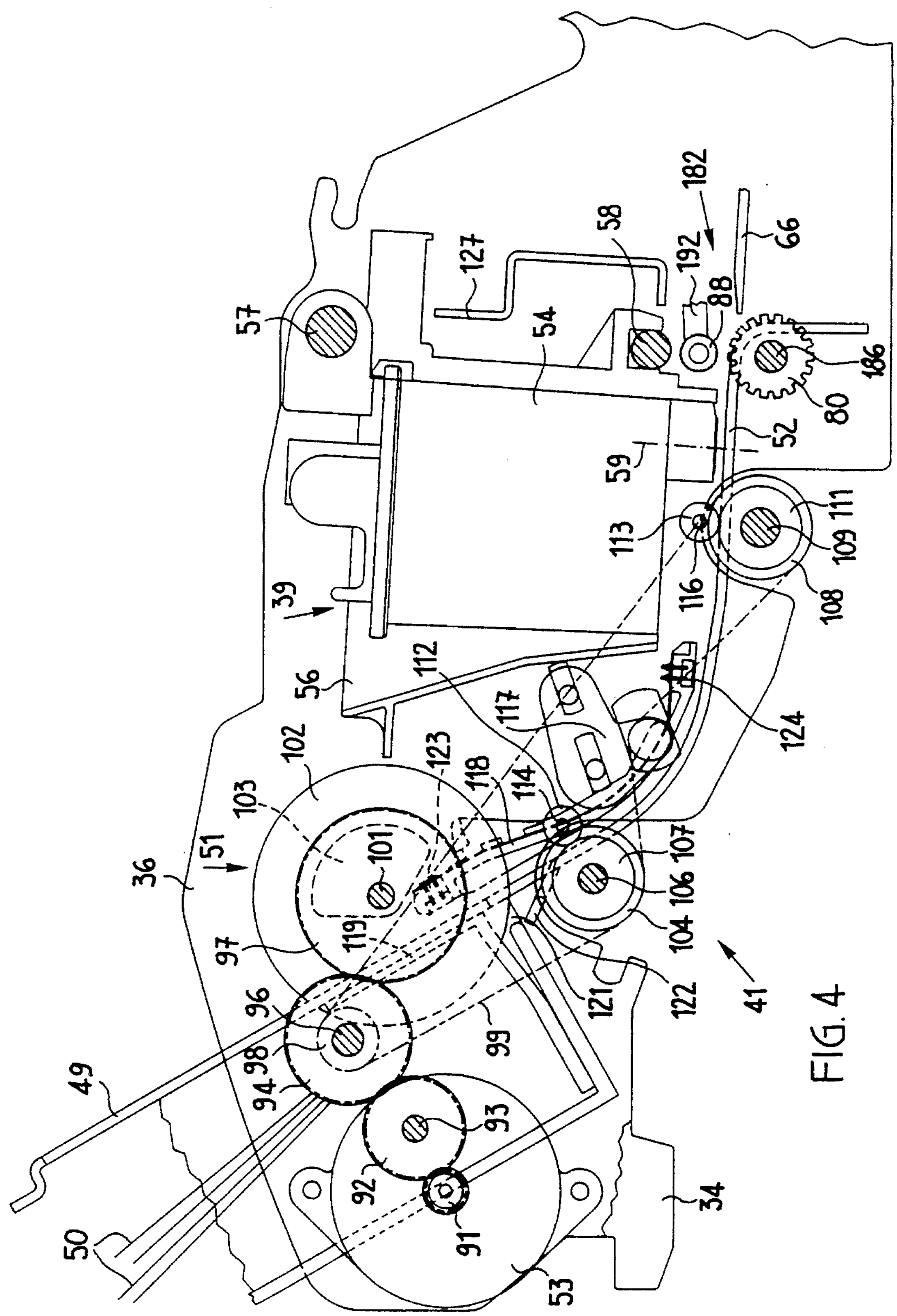
FIG. 4 is a longitudinal view of a first device of the machine shown in FIG. 1, on a different scale.
Figure 5:
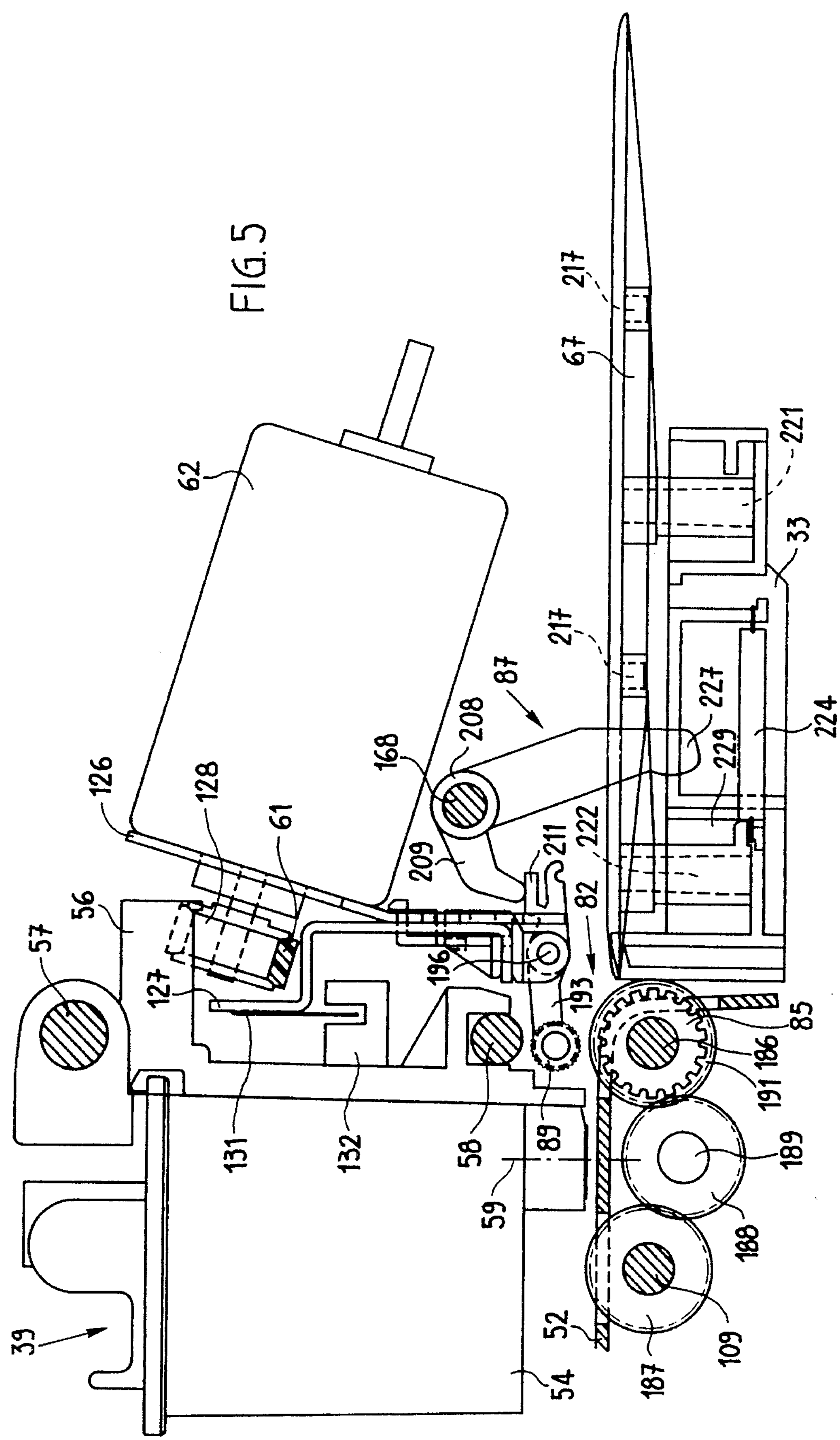
FIG. 5 is a longitudinal view of a second device of the machine shown in FIG. 1, on a different scale.
Figure 6:
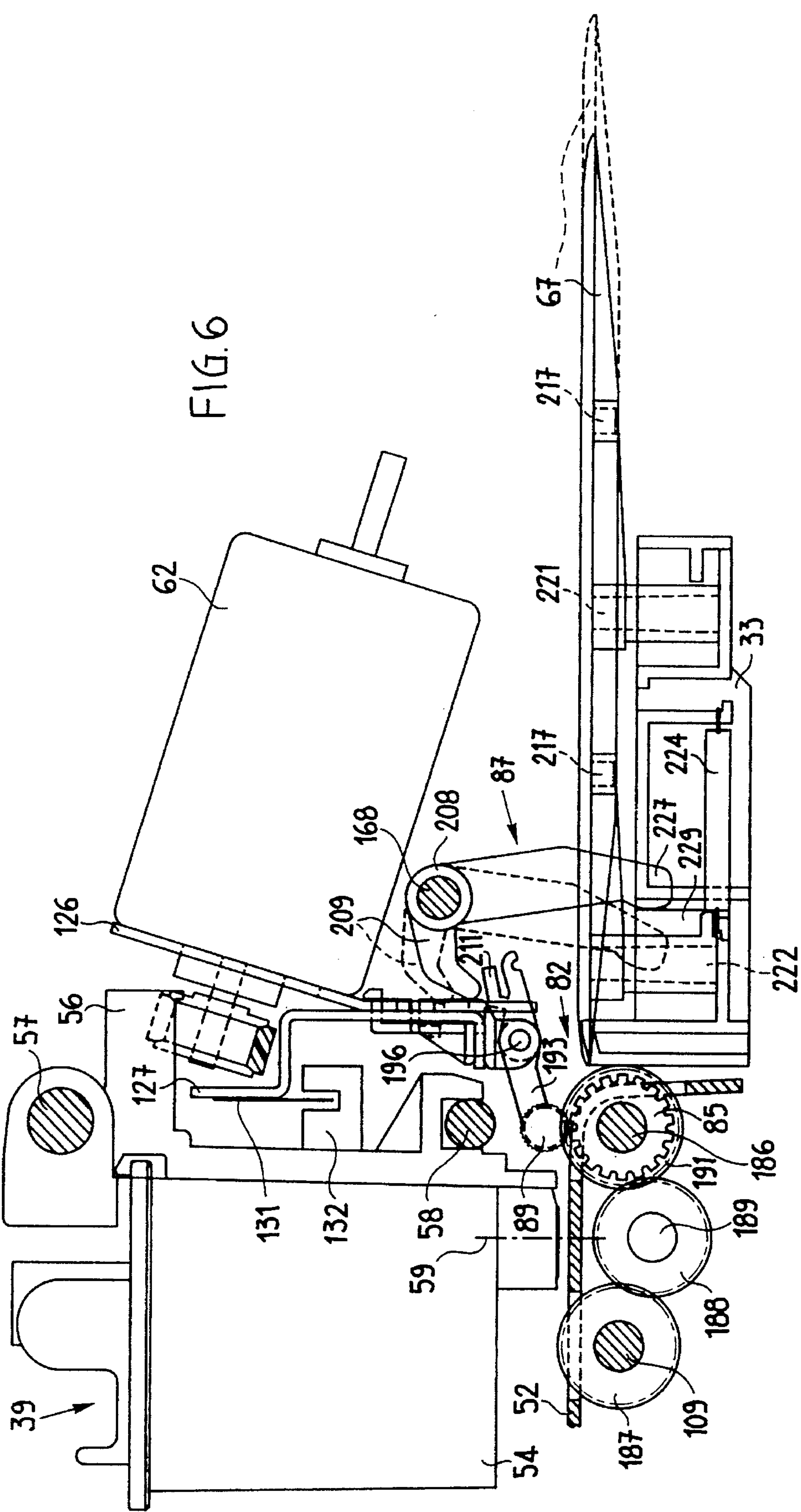
FIG. 6 is a longitudinal view of certain details of the second device shown in FIG. 5.
Figure 7:
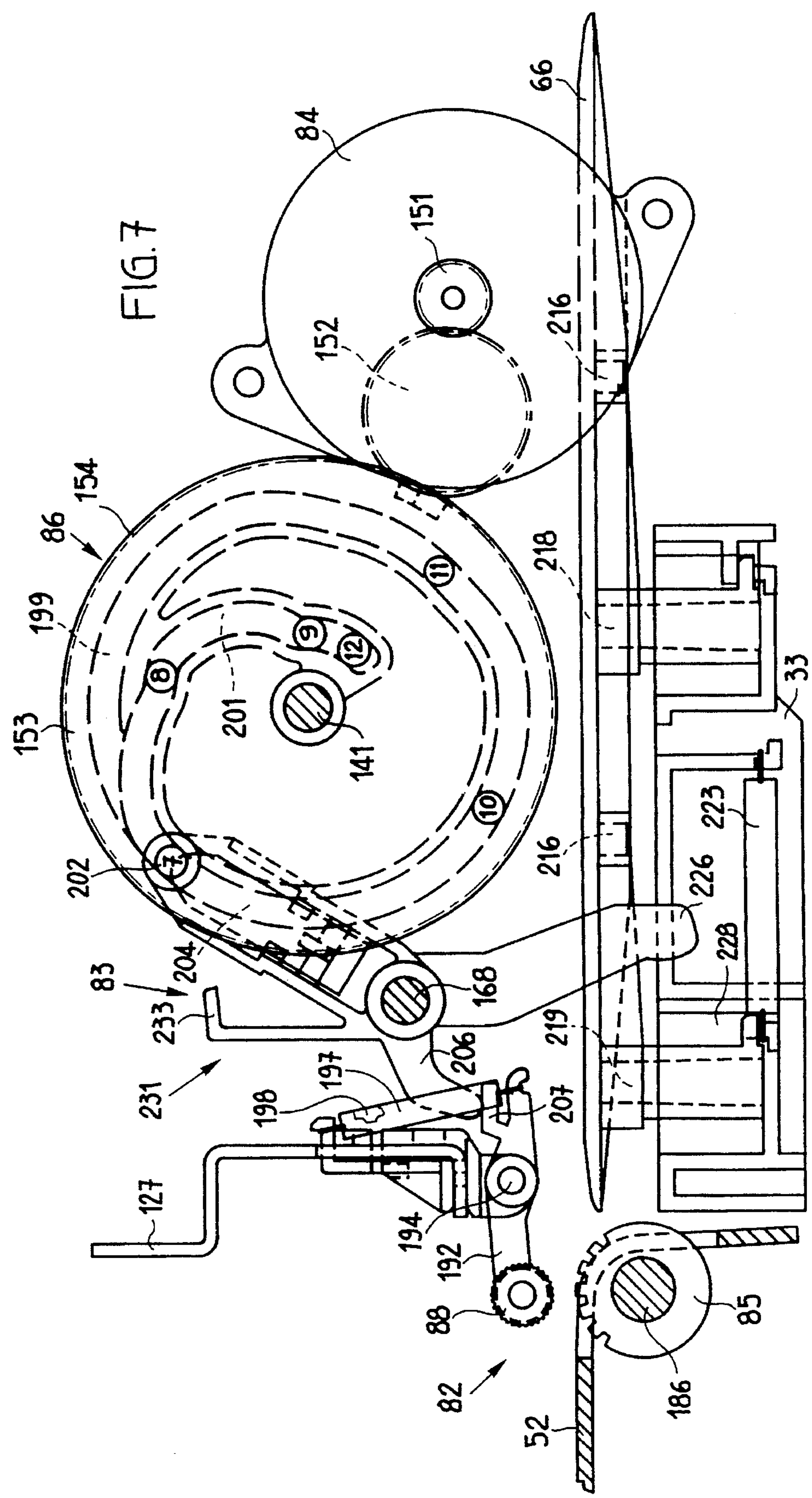
FIG. 7 is a longitudinal view of other details of the second device shown in FIG. 5.
Figure 8:
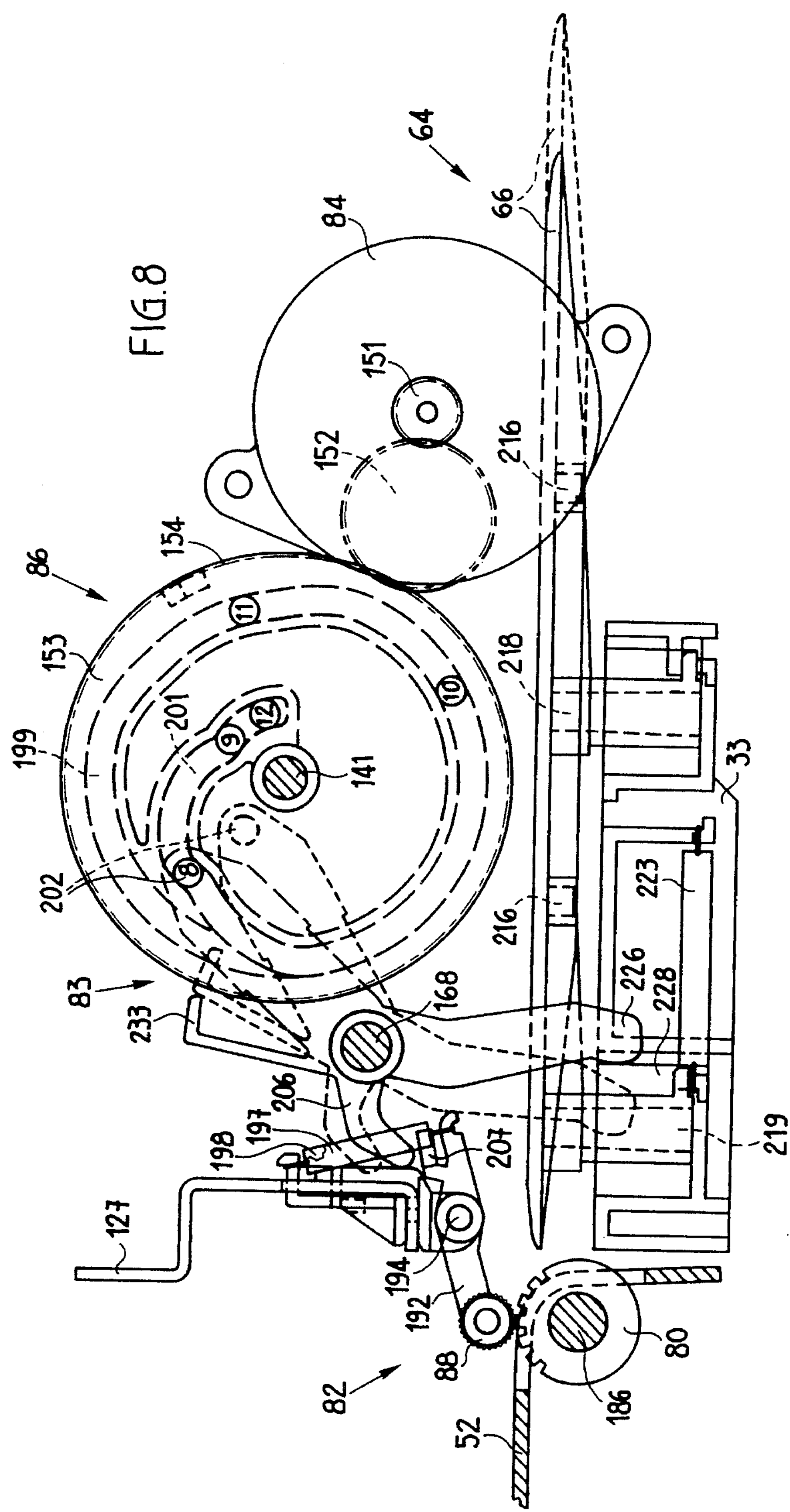
FIG. 8 is a longitudinal view of the details shown in FIG. 7, in an operating position.
Figure 9:
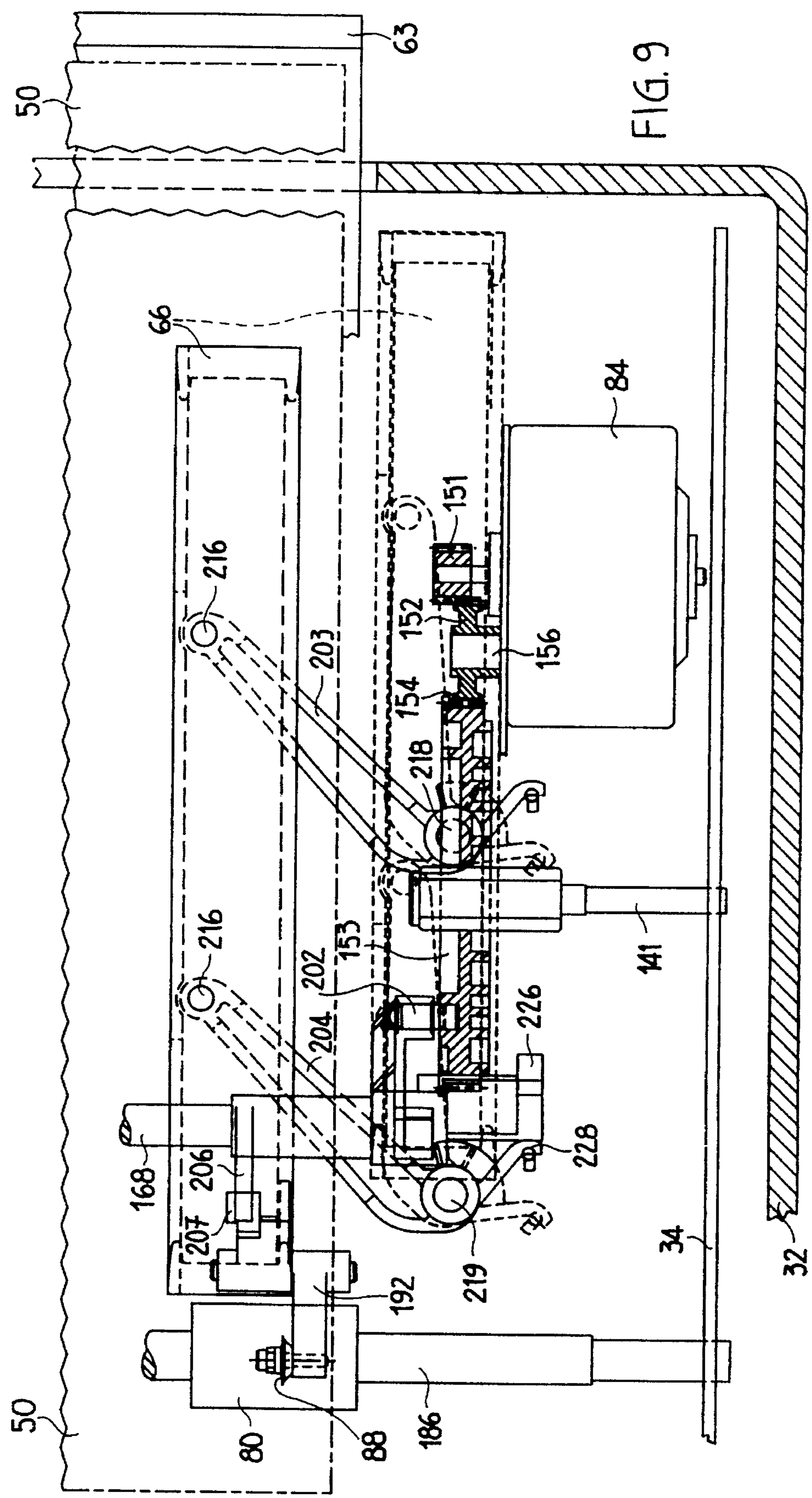
FIG. 9 is a partial plan view of the details shown in FIG. 7.
Figure 10:
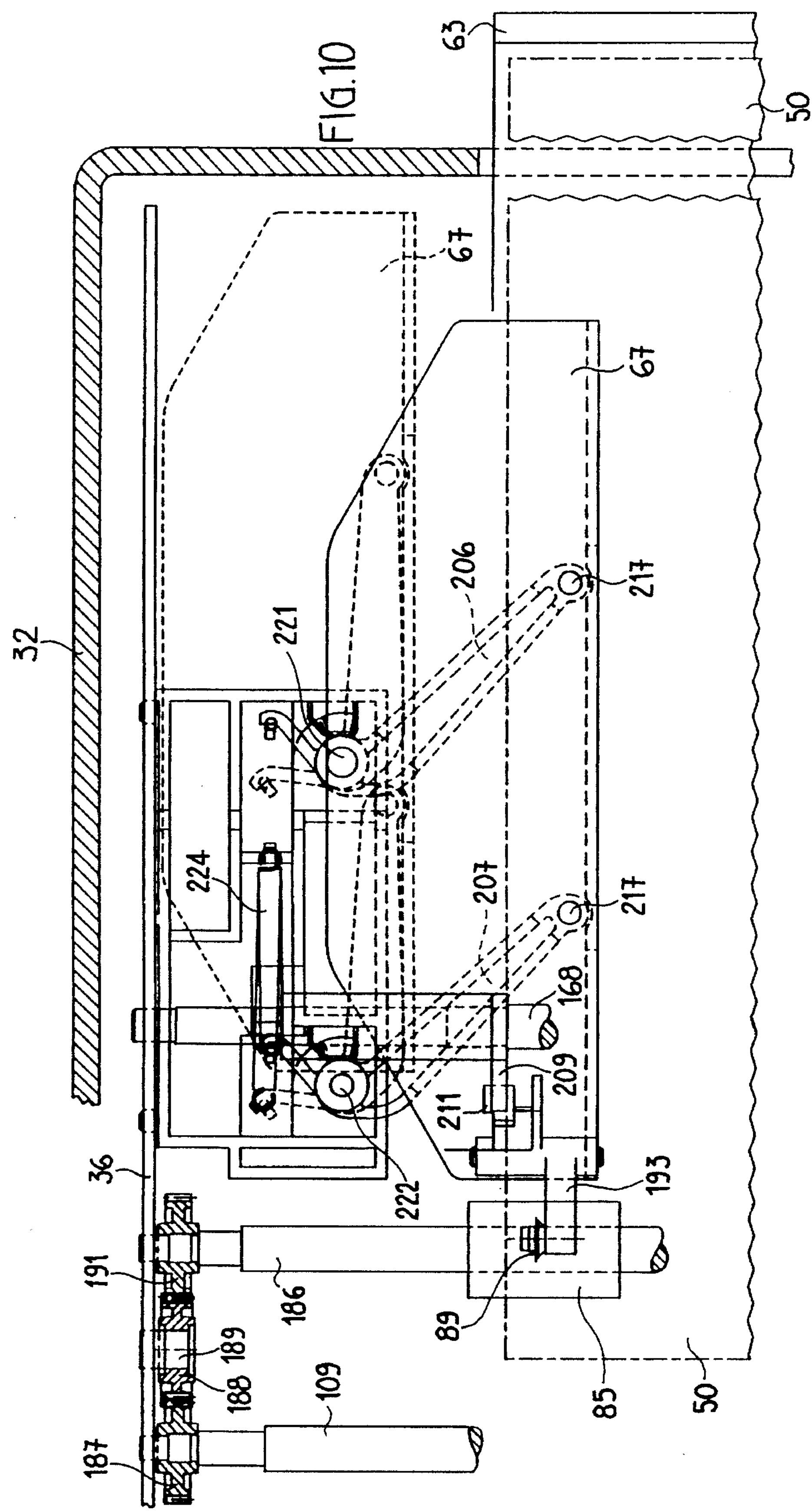
FIG. 10 is a partial plan view of certain details shown in FIG. 5.
Figure 11:
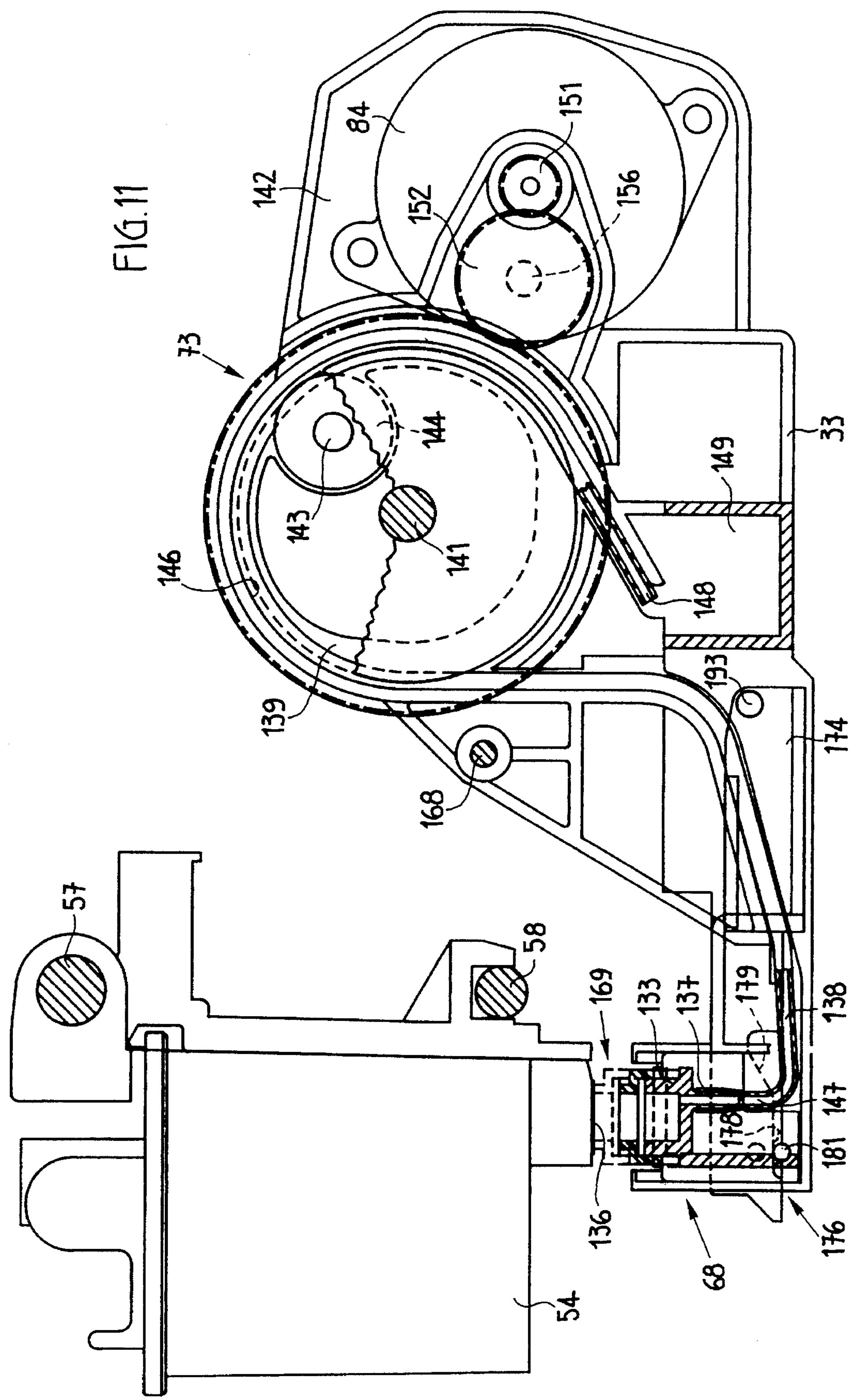
FIG. 11 is a longitudinal view of a third device of the machine shown in FIG. 1, on a different scale.
Figure 12:
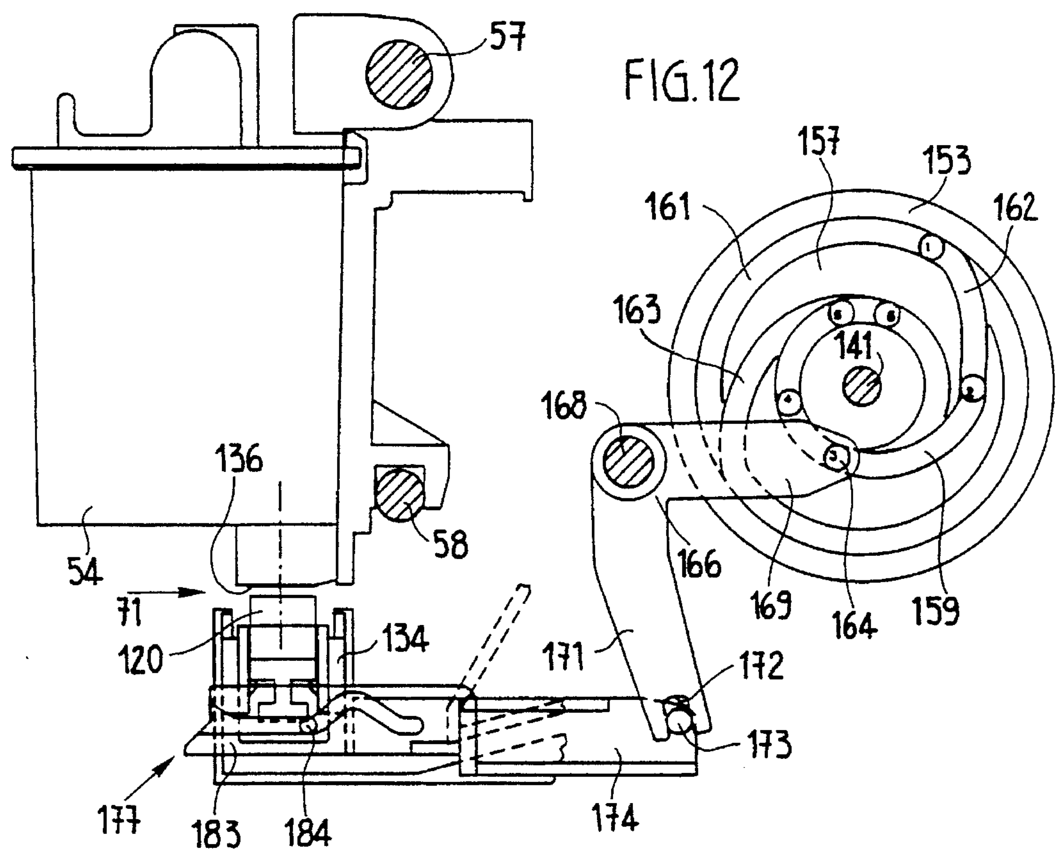
FIG. 12 is a longitudinal view of a fourth device of the machine shown in FIG. 1, on a different scale.
Figure 13:
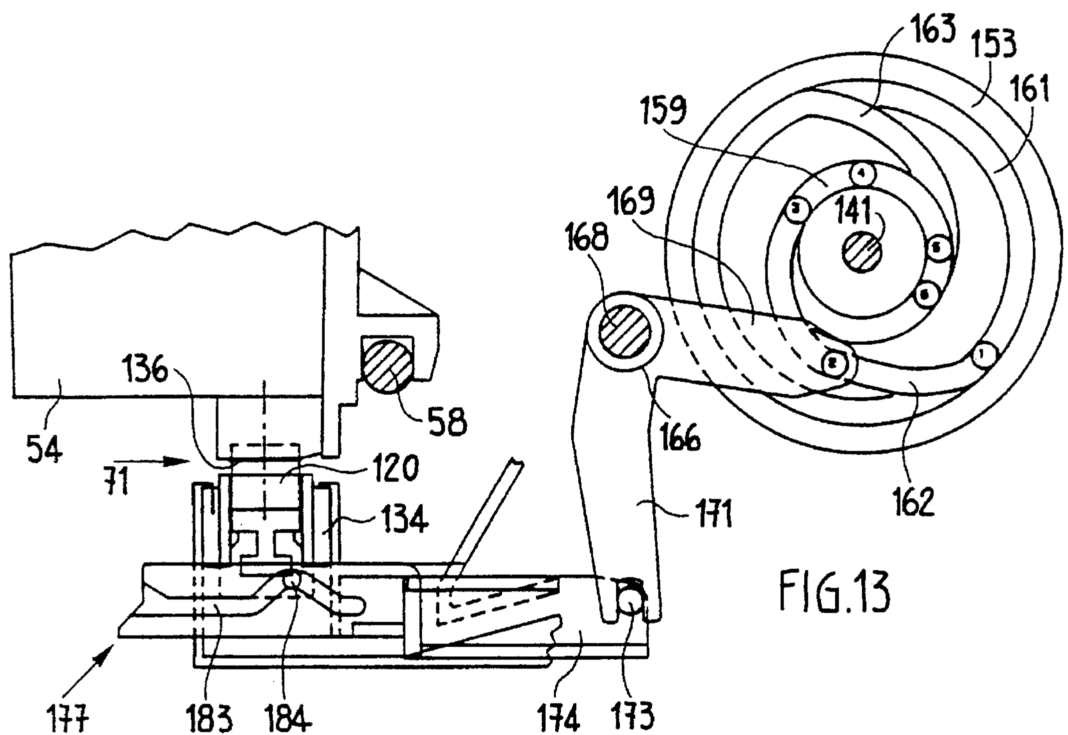
FIG. 13 is a longitudinal view of the details shown in FIG. 12, in an operating position.
Figure 14:
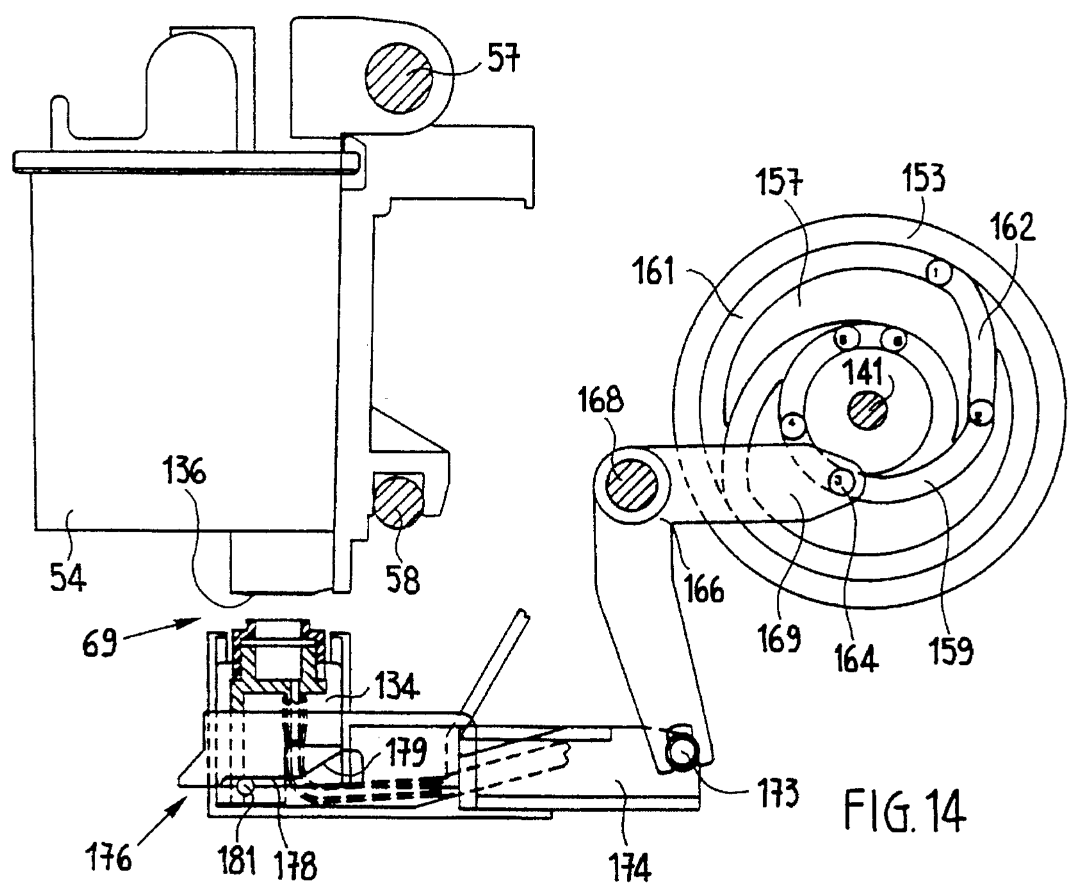
FIG. 14 is a longitudinal view of a fifth device of the machine shown in FIG. 1, on a different scale.
Figure 15:
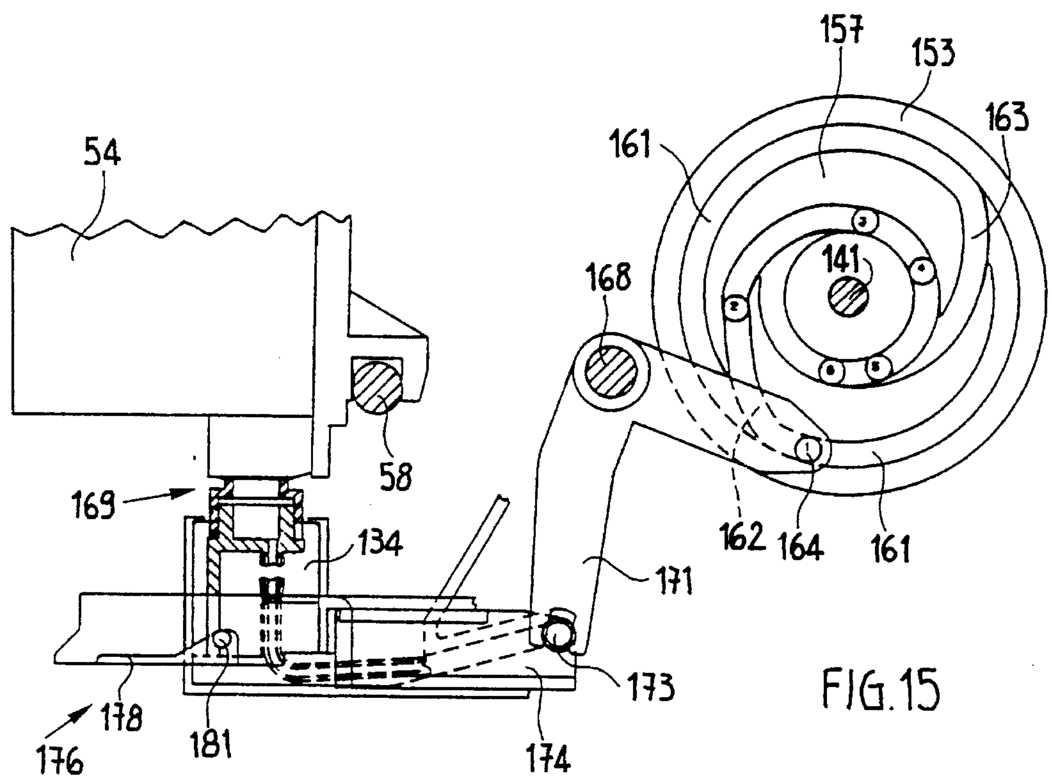
FIG. 15 is a longitudinal view of the details shown in FIG. 14, in an operating position.
Figure 16:
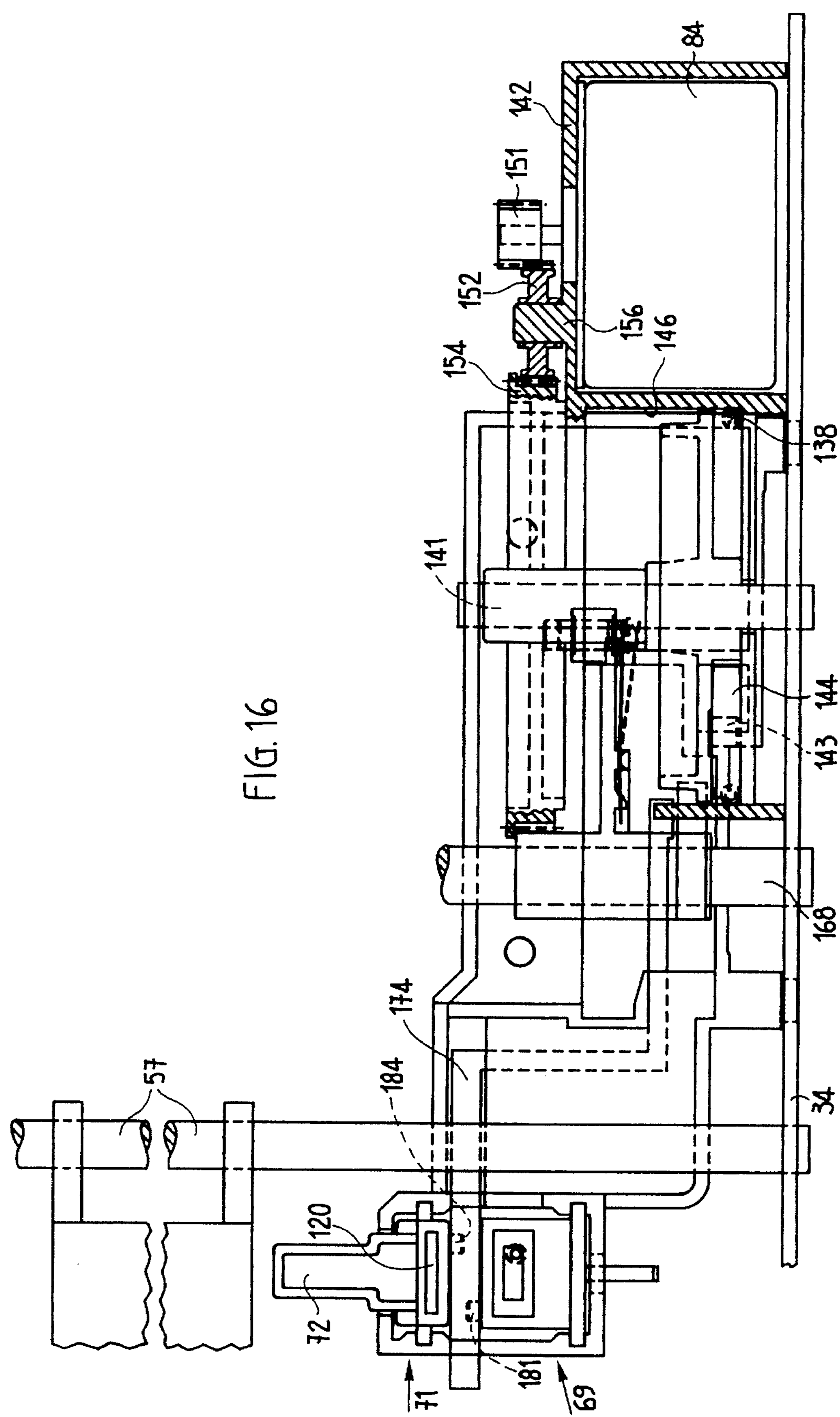
FIG. 16 is a partial plan view of the details shown in FIGS. 12 and 14.
Figure 17:
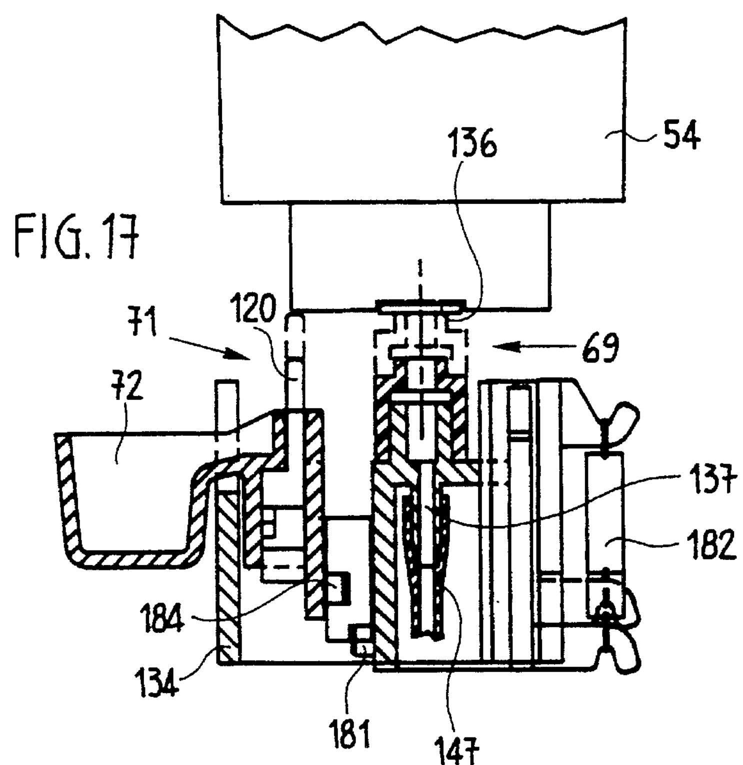
FIG. 17 is a partial front view of certain details shown in FIG. 16, on a different scale.
Figure 18:
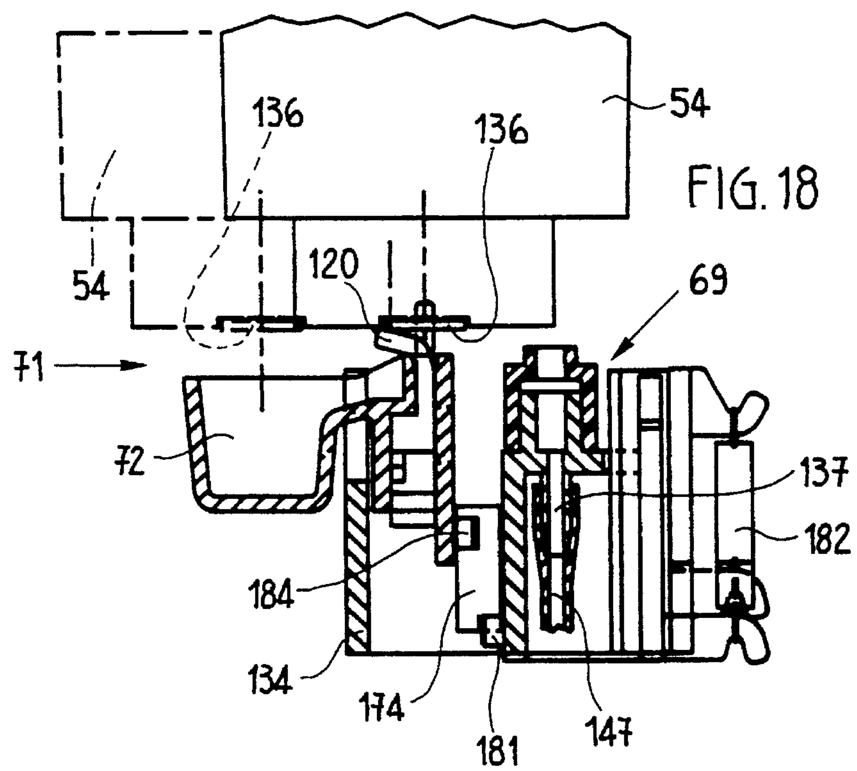
FIG. 18 is a partial front view of the details shown in FIG. 17, in an operating position.
Figure 19:
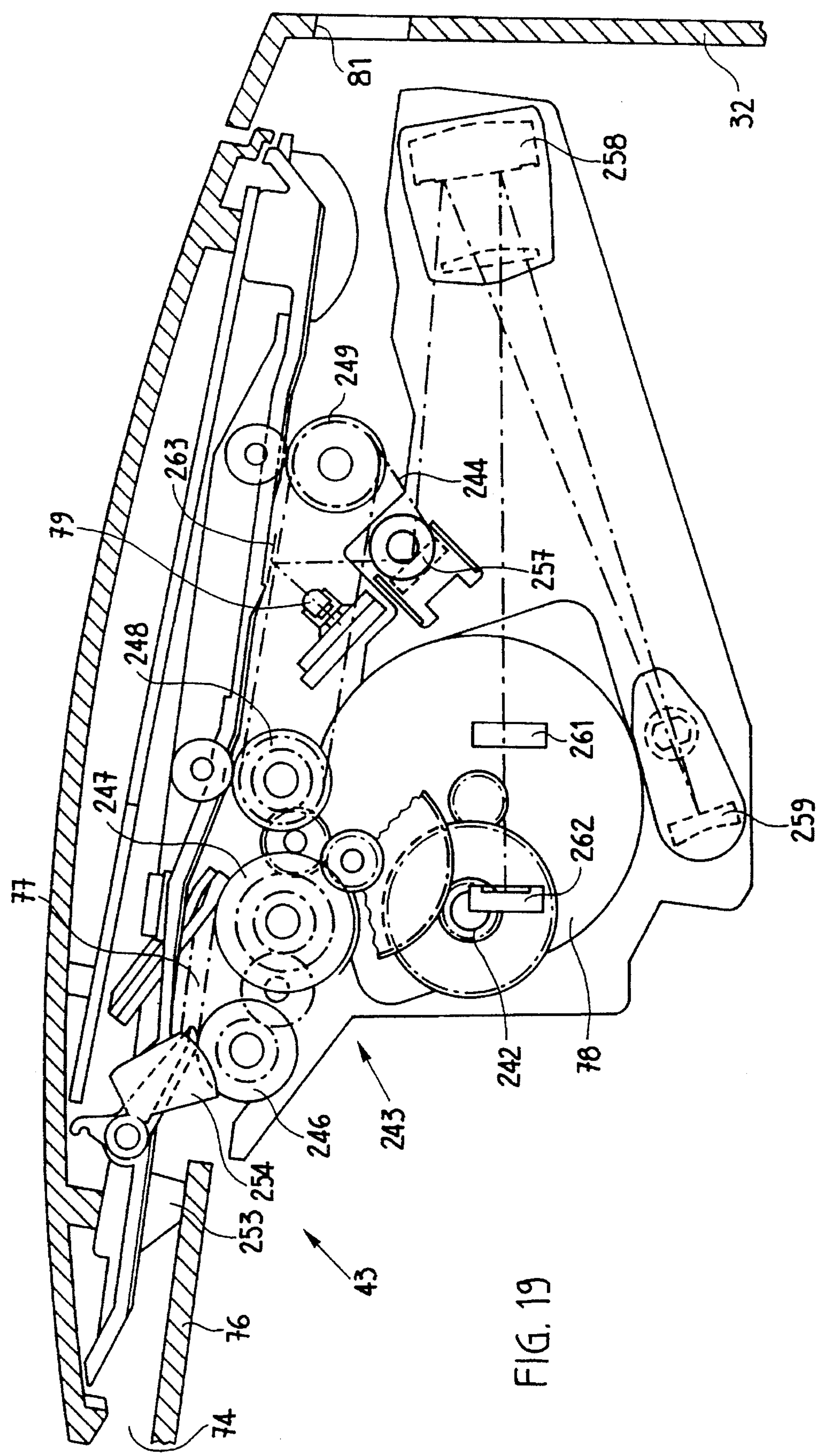
FIG. 19 is a longitudinal view of other details shown in FIG. 1, on a different scale.

With reference to FIGS. 1–22, a facsimile machine is indicated in a general way by the reference 31, and comprises a housing 32, a chassis 33 and supports 34 and 36 on the left and right hand respectively. A copy feed station 37, a line feed and copy advance device 41, a printing device 39, and a copy collection station indicated by 40 are mounted on the chassis 33.

The machine 31 also comprises an originals feed station 42, a scanner 43 for an original sheet, a set of keys 44 and an electronic controller 46 for the control and actuation of the various devices of the machine in response to signals from an external communications line and/or from the keys 44, for the performance of the typical facsimile machine functions of transmission and reception of images.

The chassis 33 comprises four feet 47 (only two of which are visible), projecting downwards, by which the housing is supported on a work surface 48. The sheet feed station 37 comprises a feed case 49 capable of holding copy sheets 50 of UNI A4 or LETT USA format. The case 49 is disposed in a position inclined forward by approximately 30° with respect to the vertical. The sheets 50 are caused to advance singly by a picker mechanism 51 towards a guide plate 52. The line feed device causes an incremental advance of the copy sheets 50, and a single motor 53, for the copy advance, is provided to drive both the picker mechanism 51 and the line feed device 41.

The printing device 39 comprises an ink-jet head 54 having a set of needles for the ejection of the ink, of the type known for example from European Patent Application No. 0 408 241. The head 54 is mounted removably on a printing carriage 56 which is in turn slidable on two bars 57 and 58 fixed to the supports 34 and 36 to form a printing line 59 next to a front part of the plate 52. The carriage 56 is fixed to a toothed belt 61 and a transport motor 62 coupled to the belt 61 causes the carriage 56 to be displaced forwards and backwards along the printing line 59.

The station 40 has a copy collection case 63 which can be partially extracted from a lower part of the housing 32. A copy holding frame, indicated by 64, comprises two guide fins 66 and 67, in alignment with the plate 52, downstream of the printing line 59, and is capable of retaining the sheet, during printing, above the case 63 of the collection station 40, to enable the ink on the sheet to dry. The frame 64 can be opened by moving the fins 66 and 67 away from each other, to lay a copy sheet 50 on other sheets 50 already collected in the case 63, without sliding, on completion of the printing of the said sheet 50.

The machine 31 also comprises a cleaning station 68 to keep the nozzles of the head 54 free from obstructions. The station 68 is disposed adjacent to the support 34, outside the printing line 59, and comprises a protective cap 69, a head wiper 71 and a drainage cup 72 which are normally disengaged from the head 54 and may be selectively placed in engagement with the head by means of corresponding actuation mechanisms. The cap 69 may adhere to the head 54 and a drainage pump 73 is provided to create a reduced pressure next to the needles which facilitates the emission of ink drops in the drainage phase.

The originals feed station 42 is housed in the upper part of the housing 32 and comprises a transverse aperture 74 and a supporting plate 76 for a set of original sheets 77, of UNI A4, B4 or A3 size. An originals advance motor 78 drives the scanner 43 to pick the sheets 77 from the plate and causes them to advance incrementally in front of an illuminator 79 to an exit aperture 81.

A sheet extraction mechanism 82 is provided to engage, during printing, a part of the copy sheet 50 adjacent to its trailing edge for an advance towards extraction such as to enable the head 54 to print lines adjacent to the trailing edge of the sheet 50, without any appreciable smudges or stains on the sheet. The mechanism 82 is caused to engage effectively with the sheet 50 by a suitable activating device 83. In particular, the mechanism 82 comprises two driven rollers 80 and 85 which are synchronised with the line feed device 41 and two pressure rollers 88 and 89 which are normally disengaged from the printed side of the sheet and are brought into engagement by the device 83.

A single service drive device 90 is also provided for both the copy holding frame 64 and the cleaning station 68. The service drive device comprises a service motor 84 and cam means 86 which may be caused to rotate by the motor 84 and are associated with an opening mechanism 87, for the opening of the copy holding frame 64, and cleaning mechanisms for activating the various parts of the cleaning station 68 according to the direction of movement of the motor 84. For a first direction of movement, the opening mechanism is activated selectively, while the cleaning mechanism remains inoperative, whereas, for a second direction of movement, the cleaning mechanism is activated selectively, while the opening mechanism remains inoperative. The service drive device also drives the activation device 83 to bring the sheet extraction mechanism 82 into effective engagement with the copy sheet 50.

PICKING MECHANISM AND LINE FEED DEVICE

The motor 53 (FIGS. 1 and 4) is of the stepper type, is fixed on the left-hand support 34, and has a pinion 91 which is constantly engaged with a first gear wheel 92 which is rotatable on a shaft 93 of the support 34, and engaged in turn with a second gear wheel 94 which is rotatable on a shaft 96 of the support 34. The wheel 94 is engaged with a third gear wheel 97 and is integral with a gear 98 which is in turn engaged with a toothed belt 99 of the line feed device 41. The gear wheel 97 is rotatable on a shaft 101 which runs along the whole length of the chassis 33 and is supported by the supports 34 and 36. The gear wheel 97 is fixed on a driving part of a one-way clutch 102 of the picking mechanism 51, having a driven part fixed to the shaft 101. The clutch 102 may be engaged in response to a small anti-clockwise rotation of the driving part and remains engaged for only one cycle of rotation of its driving part through 360°. Rubber picking sector pieces 103 are mounted on the shaft 101 and pick single sheets from the case 49 in response to an activation of the clutch 102 and to the rotation of the motor 53.

In the line feed device 41, the toothed belt 99 is engaged with a first roller advance gear 104 which is rotatable on a shaft 106 which runs along the whole width of the chassis 33 and is supported by the left-hand support 34 and right-hand support 36, is parallel to the shaft 101, and supports in an angularly fixed way a set of rubber rollers 107 whose peripheral parts project from apertures in the plate 52. The first roller advance gear 104 is positioned below and adjacent to the bottom of the case 49 and the set of rubber rollers 107 is positioned along the length of the shaft 106 but within the width of the case 49, to interact with the copy sheets 50.

The toothed belt 99 is also engaged with a second roller advance gear 108 which is rotatable with a shaft 109 which runs along the whole width of the chassis 33 and is supported by the supports 34 and 36. The shaft 109 is parallel to the shafts 101 and 106 and supports in an angularly fixed way a set of rubber rollers 111 which also project from apertures in the plate 52. The second roller advance gear 108 is positioned adjacent to but upstream of the printing line 59 (shown by the dots and dashes in FIG. 4), and the set of rubber rollers 111 is positioned along the length of the shaft 109 but within the width of the case 49, to interact with the sheets 50.

Two sets of pressure rollers 112 and 113 interact with the corresponding sets of rollers 107 and 111 to advance the copy sheet 50 when the stepper motor 53 is activated by the electronic controller 46. The pressure rollers 112 and 113 are rotatable on two shafts 114 and 116 of the supports 34 and 36. The stepper motor 53 causes the gears 104 and 108, and consequently the sets of rubber rollers 107 and 111, to rotate in such a way as to impart the same peripheral velocity to the rollers 107 and 111. An ordinary belt tensioning device 117, known per se and shown schematically in the drawings, regulates the tension of the toothed belt 99 and is supported by the left-hand support 34. The guide plate 52 is fixed to the supports 34 and 36 and, together with a counter plate 118, is capable of guiding the sheet 50 from the case 49 towards the rollers 107 and 112, after it has been picked up by the sector pieces 103, and towards the rollers 111 and 112. The guide plate 52 then guides the sheet 50 to a short distance downstream of the printing line 59.

The feed case 49 comprises a front aperture 119 through which the sector pieces 103 pick the sheet 50 from the case 49 through a lower aperture 121. The sheet 50 is then engaged by a projecting plate 122 of the plate 52 and is guided by the plate 52 and by the counter plate 118 towards the rollers 107 and 112. A paper end detector 123 is positioned on the counter plate 118 opposite the front aperture 119 to detect and signal to the electronic controller 46 the absence of sheets 50 in the case 49. A margin detector 124 is positioned on the counter plate 118, opposite the plate 52 close to and upstream of the rubber rollers 111, to detect and signal to the electronic controller 46 the start of the top margin and the end of the bottom margin of the sheet 50, which represent the leading and trailing edges respectively of the said sheet 50.

The operation of the line feed device 41 has been described only in relation to what has been described previously, but in the following text it will be described with its connection to and synchronisation with the other devices of the machine 18.

The electronic controller 46 first sends a set of pulses to the stepper motor 53 which causes the pinion 91 to rotate in the counter-clockwise direction. The gear wheels 92, 94 and 97 rotate with the pinion 91, causing the driving part of the clutch 102 to rotate in the counter-clockwise direction, in the direction of engagement of the said clutch 102.

The electronic controller 46 then sends a set of other pulses to the stepper motor 53 which causes the pinion 91 to rotate in the counter-clockwise direction. The picking sector pieces 103 are caused to rotate, and, through the front aperture 119, engage the copy sheet 50 adjacent to the aperture 119. The sheet 50 is made to pass through the lower aperture 121 and is guided by the projecting plate 122 towards the rubber rollers 107 and the pressure rollers 112. After a certain degree of rotation, the sector pieces 103 release the sheet 50. On completion of a 360° cycle of the shaft 101, the clutch 102 is disengaged and the sector pieces 103 remain in the disengaged position.

The gear wheels 92, 94 and 97 rotate with the pinion 91. The gear 98 transmits the motion to the toothed belt 99 and this causes the rubber rollers 107 and 111 to rotate. The sheet 50, picked by the sector pieces 103, is engaged between the rollers 107 and 112 and made to advance along the guide plate 52. The margin detector 124 signals to the electronic controller 46 the start of the top margin of the sheet 50, which is engaged by the rollers 111 and 113 and is made to advance past the printing line 59 until the margin detector 124 signals to the electronic controller 46 the end of the bottom margin of the sheet 50. After a predetermined time interval, the electronic controller 46 ceases to send the pulses, and the stepper motor 53 stops.

PRINTING DEVICE

In the printing device 39 (FIGS. 1, 3, 4, and 5), the head 54 has 50 nozzles, distributed in two columns of 25 rows. The transport motor 62 is of the direct current (D.C.) type and is fixed to a flange 126 of a cross-piece 127 integral with the supports 34 and 36, adjacent to the right-hand support 36. The D.C. motor 62 comprises a pinion gear 128 engaging with the belt 61 and the carriage 56 is connected to the upper run of the belt 61.

The position of the carriage 56 on the bars 57 and 58 is detected by a linear encoder 129 having a fixed part 131 and a movable part 132 fixed to the carriage 56. The fixed part 131 extends along the supports 34 and 36 and has a number of close-set light-transmitting gaps. The movable part 132 has an illuminator/detector pair to detect the various positions of the carriage along the printing line 59, outside the printing line and at the cleaning station 68. In response to the signals received from the encoder 129, the electronic controller 46 activates the D.C. motor 62 to cause the pinion 128 to rotate in one of the two directions and, through the toothed belt 61, to displace the carriage 56 along the printing line 59 in both directions.

CLEANING STATION

The protective cap 69 comprises a hollow body 133 positioned in a support 134 of the chassis 33, movable from a rest position to an operating position in which it interacts with a needle support plate 136 of the head 54 during the activation cycles of the drainage pump 73. The hollow body 133 has at its bottom a coupling 137 which is connected to the pump 73 through a flexible tube 138. In this way the ink residues sucked from the head 54 may be sucked away by the pump 73.

The head wiper 71 comprises a rubber sheet 120 which is positioned in a support 134 adjacent to the protective cap 69 and is movable from a rest position to an operating position in which it interacts with the needle support plate 136 to clean and remove ink residues.

The drainage cup 72 is positioned adjacent to and is connected to the sheet 120 to collect the ink residues which the sheet 120 removes by contacting the needle support plate 136 when the rubber sheet 120 is in the operating position. The cup 72 also collects the ink when a head drainage cycle is executed as described below. The ink collected in the drainage cup 72 evaporates by a natural process.

The drainage pump 73 is of the peristaltic type and uses progressive deformations of the tube 138 to create corresponding pressure drops. It comprises a circular plate 139 fixed on a shaft 141 rotatably supported by a flange 142 of the chassis 33 and by the left-hand support 34. The plate 139 has a stud 143 on which there is a rotatable pressure member in the form of a disc 144 capable of interacting with a working section of the flexible tube 138. This working section is positioned in a circular housing 146 of the chassis 33 and has one end 147 connected to the coupling 137 of the cap 69. Another end 148 is in a cavity 149 of the chassis 33 which is capable of collecting the ink residues which the pump 73 sucks from the head 54.

SERVICE DRIVE DEVICE

In the service drive device 90 (FIGS. 1, 3, 4, 5, 6, 7, 8, 9, 10 and 11), the service motor 84 is of the stepper type and has a pinion 151 engaged with an intermediate gear 152. The cam means 86 comprise a double cam 153 having external teeth 154 engaged with the gear 152. The motor 84 is fixed on the flange 142 of the chassis 33, having a stud 156 on which the intermediate gear 152 is rotatable. The motor 84 is controlled by the electronic controller 46 and through the double cam 153 performs the following functions: activation of the pump 73, positioning of the protective cap 69, positioning of the head wiper 71, engagement of the two extractor rollers 88 and 89 with the corresponding toothed rubber rollers 80 and 85, and finally, displacement of the guide fins 66 and 67 of the frame 64.

The double cam 153 consists of a disc of a specific thickness, fixed to the shaft 141, in which the external teeth 154 are formed on the external surface. A first cam 157 is formed on one side of the cam 153 and a second cam 158 is formed on the opposite side. The first cam 157 is connected to the mechanism which moves the various parts of the cleaning station 68. The second cam 158 is connected to the mechanism which moves the pressure rollers of the extractor mechanism 82 and moves the guide fins 66 and 67. The same cam 153, through the shaft 141, also drives the pressure member of the pump 73.

The first cam 157 consists of a snail profile having two channels 159 and 161 which are concentric with respect to each other and to the shaft 141, but are of different diameters, and are for minimum and maximum raising respectively. The two channels 159 and 161 have their bottoms at different depths and are connected by two diametrically opposite ramps 162 and 163, for raising which increases progressively in the counter-clockwise direction. The two channels 159 and 161 and the two ramps 162 and 163 are capable of containing a stud 164 of a cam follower lever 166. In the rest state, the stud 164 is in a reference position "3" in the channel 159, corresponding to maximum raising.

The stud 164 is axially movable and is kept by a leaf spring 167 in engagement with the bottom of the channels 159 and 161 and of the ramps 162 and 163. The ramps 162 and 163 in turn have areas of interchange with the channels 159 and 161 having graduated areas and projecting steps. The area of interchange between the ramp 162 and the channel 161 gives access to the channel 161 with travel in the counter-clockwise direction. The step between the channel 161 and the ramp 162 allows the stud 164 to remain in the channel in counter-clockwise travel, but makes it return to the ramp 162 in clockwise travel.

The cam follower lever 166 is pivoted on a shaft 168 supported by the left-hand support 34 and the right-hand support 36, and comprises a first arm 169 on which the stud 164 is mounted and a second arm 171 having at its end a fork 172 capable of housing the stud 173 of a control slide 174. The slide 174 is guided by the support 134 and comprises two cam profiles 176 and 177, positioned opposite each other on the longest edges and capable of moving the protective cap 69 and the head wiper 71 respectively between a rest position and an operating position.

The cam profile 176 comprises a low horizontal edge 178 of a given length and an inclined edge 179, connected to the edge 178. A stud 181 projecting from the protective cap 69 is held against the edge 178 by the action of a spring 182 exerted between the protective cap 69 and the support 134. The second cam profile 177 comprises a snail profile 183 having a lower horizontal section and a higher inverted V-shaped section capable of positively guiding a stud 184 projecting from the head wiper 71.

When it is in the rest position "3", the stud 164 of the cam follower lever 166 places the slide 174 in a position in which the studs 181 and 184 engage the lower edges 178 and 183 respectively. The protective cap 69 and the head wiper 71 are consequently in the rest positions, under the trajectory of the head 54. In response to the pulses of the electronic controller 46, the motor 84 causes the clockwise or counter-clockwise rotation of the pinion 151 and, through the intermediate gear 152, of the external teeth 154 with the double cam 153.

In response to an counter-clockwise rotation, the cam 157 causes the stud 164 to travel from the position "3" along the constant minimum raising channel 159 and keeps the cam follower lever 166 and the various parts of the cleaning station 68 at rest. In response to a clockwise rotation, the first cam 157 moves the stud 164 from the rest position "3" and from the minimum raising position in the channel 159 to an operating position "2" of intermediate raising on the ramp 162 and to an operating position "1" of maximum raising in the channel 161. From position "1", in response to an counter-clockwise rotation, the step for the channel 161 and the ramp 162 cause the stud to return to the ramp 162 and cause the stud 164 to return from the operating position "1" to the operating position "2" and then to the rest position "3".

When the first cam 157 is made to rotate in the clockwise direction, towards the operating position "2", the ramp 162 causes the cam follower lever 166 to rotate in the clockwise direction. The cam follower lever 166 consequently causes the control slide 174 to move forwards along a small distance. The stud 181 of the protective cap 69 still remains in engagement with the lower edge 178 of the profile 176. On the other hand, the stud 184 of the head wiper 71 is raised by the front part of the inverted V profile 183 and moves the head wiper 71 upwards into the operating position.

If the cam 157 is made to rotate further in the clockwise direction, the stud 164 is moved from the operating position "2" to the operating position "1" and causes the cam follower lever 166 to rotate in a clockwise direction. The lever 166 in turn moves the control slide 174 forwards through the whole of its travel. The stud 181 of the cap 69 encounters the inclined and projecting edge 179 and allows the spring 182 to raise the cap 69 towards the operating position. At the same time, the stud 184 of the head wiper 71 is lowered by the rear part of the inverted V profile 183 and moves the head wiper 71 downwards to the rest position. This positioning of the cap takes place during the drainage cycles, in which the head 54 is in a position beyond the printing line 59, and the spring 182, in the operating position, keeps the protective cap 69 hermetically adhering to the needle support plate 136, while the stud 181 is released from the edge 179.

A rotation of the cam 157 in the counter-clockwise direction from position "1" causes the stud 164 to be guided from the step of the channel 161 adjacent to the ramp 162 on the said ramp 162 and to return to the operating position "2" on the ramp 162. This causes the cam follower lever 166 to rotate in the counter-clockwise direction. The lever 166 in turn moves the control slide 174 backwards for a certain distance. The stud 181 of the cap 69 is engaged, in sequence, first by the inclined edge 179 of the cam profile 176 which lowers the cap 69 against the action of the spring 182, and then by the horizontal edge 178 which keeps the cap 69 in the rest position. At the same time, the stud 184 is raised by the front part of the inverted V profile 183 and moves the head wiper 71 upwards to the operating position.

A further rotation of the cam 157 in the anti-clockwise direction causes the stud 164 to be moved from the position "2" to the rest position "3" and causes the cam follower lever 166 to rotate in the counter-clockwise direction. The cam follower lever 166 moves the control slide 174 backwards, returning it to the rest position. The stud 181 remains in engagement with the horizontal edge 178 of the cam profile 176. The stud 184 is lowered by the rear part of the inverted V profile 183 and consequently the head wiper 71 is also lowered and kept in the rest position.

A drainage cycle of the head 54 is initiated by pressing a drainage key in the set of keys 44. In response to this command, the electronic controller 46 sends a set of sequential pulses to the D.C. motor 62 and to the stepper motor 84. The D.C. motor 62 moves the carriage 56, through the pinion 128 and the belt 61, towards the left-hand support 34, positioning it in a first non-printing position, in which the head 54 is next to the protective cap 69.

The motor 84 then causes the cam 157 to rotate in the clockwise direction to move the stud 164 from the rest position "3" to the operating position "1". The cam follower lever 166 moves the control slide 174 fully backwards. The stud 181, following the inclined edge 179, allows the spring 182 to raise the protective cap 69 until it is positioned in the operating position in which it adheres to the needle support plate 136.

The electronic controller 46 then causes 8 discharge cycles to be executed to drain the head 54. Simultaneously, through the motor 84, it causes the clockwise rotation of the double cam 153 and consequently of the plate 139 and the disc 144, for a number of intervals corresponding to two complete rotations of the disc 144. During its rotation, the disc 144, by flattening the tube 138, progressively increases the volume, isolated from the exterior, available to the air contained in the cap 69. This creates a suction effect which facilitates the expulsion of any obstructions in the needles, in combination with the discharge action. The ink discharged into the cap 69 is also sucked out. The simultaneous rotation of the first cam 157 has no effect on the cam follower lever 166. The stud 164 travels along the constant maximum raising channel 161 and the areas of interchange with the ramps 162 and 163 are encountered in the descending direction of the steps. The difference in depth is compensated for by the spring 167.

At the end of the 2 pump cycles, the motor 84 rotates the first cam 157 in the counter-clockwise direction from position "1" to the operating position "2" to move the stud 164. The cap 69 is then brought to the rest position and the head wiper 71 moves to the operating position. The D.C. motor 62 then causes the carriage 56 to move towards the printing line, causing the head to pass across the head wiper 71 and positioning it in a second non-printing position, in which the head wiper 71 cleans the needles of the plate 136.

The motor 84 causes the first cam 157 to rotate in the clockwise direction to position the stud 164 again in the operating position "1" in which the protective cap 69 is in the operating position. It then causes the pump 73 to rotate for 7 pump cycles to discharge the ink from the flexible tube 138, and then positions the stud 164 in the rest position "3". Finally, the D.C. motor 62 causes the carriage 56 to move, positioning the head 54 in a third non-printing position, next to the cup 72. At this point the electronic controller 46 causes 24 discharge cycles to be executed to drain the head.

If the facsimile machine 18 remains in the stand-by state, in other words without receiving printing commands for more than 1.6 seconds, the D.C. motor 62 is activated to position the carriage 56 in the first non-printing position in which the head 54 is next to the protective cap 69. The motor 84 is activated to cause the cam 157 to rotate in the clockwise direction to bring the stud 164 into the operating position to make the cap 69 adhere to the needle support plate 136. The motor 62 is stopped at the position reached, and the cap 69 keeps the needles in a moist atmosphere which prevents the said needles from becoming blocked.

The head cleaning cycle is executed before the printing of each sheet 50 and also after 60 seconds, during the printing of the sheet 50, under the control of the electronic controller 46 without any external command from the keys 31.

The electronic controller 46 again activates the motors 84 and 62, to move the stud 164 to position "2" and the head wiper 71 to the operating position. The carriage 56 is positioned successively in the first and second non-printing positions with the head 54 passing across the head wiper 71. The motor 84 then causes the first cam 157 to rotate in the anti-clockwise direction, positioning the stud 164 in the rest position "3", and the motor 62 causes the carriage 56 to move to the third non-printing position, positioning the head 54 next to the drainage cup 80. At this point the electronic controller 46 causes 8 discharge cycles to be executed to drain the head.

In this case also, if the machine remains in the stand-by state for more than 1.6 seconds, the motors 62 and 84 are again activated thereby bringing the cap 69 to adhere to the needle support plate 136 of the head 54.

EXTRACTION MECHANISM

In the extraction mechanism 82, the two rollers 80 and 85 have toothed rubber peripheral parts projecting from apertures in the plate 52. The two rollers 80 and 85 are fixed to a shaft 186 supported by the left-hand support 34 and the right-hand support 36, and parallel to the shafts 101, 106 and 109. The two rollers 80 and 85 are positioned adjacent to but downstream of the printing line 59 and opposite the rubber rollers 111, with respect to a geometrical plane perpendicular to the plate 52 and passing through the printing line 59.

A gear 187 (see also FIGS. 3, 6 and 7) is integral with the shaft 109, is positioned adjacent to the right-hand support 36 and is engaged with an intermediate gear 188 which is rotatable on a shaft 189 on the right-hand support 36. The intermediate gear 188 is in turn engaged with a gear 191 on the shaft 186 on which the rollers 80 and 85 are fixed. The rollers 80 and 85 are therefore driven by the motor 53. When the stepper motor 53 causes the rubber rollers 107 and 111 to rotate, it causes the two rollers 80 and 85 to rotate through the gears 187, 188 and 191. The mechanical connection between the shafts 109 and 186 is such that it ensures synchronisation between the peripheral velocity of the rollers 80 and that of the rollers 111.

The two toothed rubber rollers 80 and 85 have fine external teeth and a width of a few centimeters. The two pressure rollers 88 and 89 have very fine external teeth, are spaced approximately 250 mm apart, and have a very small width of approximately 0.8 mm. The rollers 88 and 89 are movable from the position of disengagement from the rollers 80 and 85 respectively to an operating position in which they are pushed towards the teeth of the rollers 80 and 85 to engage the trailing edge of a partially printed sheet 50.

With this structure, the rollers engage areas of the printed sheet 50 adjacent to the lateral edges. The very fine external teeth and the width of approximately 0.8 mm prevent the two rollers 88 and 89, in contact with the still wet ink on the sheet 50, from causing smudges and/or stains. Each of the rollers 88 and 89 is rotatable on a rocker arm 192, 193 oscillating on a pivot 194, 196 on the cross-piece 127. Springs 197 and 198 tend to cause the corresponding rocker arms 192 and 193 to rotate in the counter-clockwise direction to bring the extractor rollers 88 and 89 into engagement with the corresponding rollers 80 and 85.

The activation device 83 is capable of interacting with the two rocker arms 192 and 193 to hold the two pressure rollers 88 and 89 in the rest position against the action of the springs 197 and 198. When it is activated, it allows the springs 197 and 198 to position the two rollers 88 and 89 in the operating position. In particular, the activation device 83 comprises the second cam 158 of the double cam 153 and a cam follower lever 203.

The second cam 158 is on one side of the cam 153 opposite that of the first cam 157, and comprises a snail profile having a maximum raising channel or area 199 concentric with the shaft 141 and adjacent to the teeth 154. A ramp 201 is connected to the channel 199 through an interchange area with a step and extends towards a minimum raising area with a greater axial depth, terminating adjacent to the shaft 141.

The channel 199 and the ramp 201 are capable of guiding a stud 202. The stud 202 is axially movable and is held against the bottom of the channel 199 and of the ramp 201 by a leaf spring 204 similar to the leaf spring 167. The interchange area between the ramp 201 and the channel 199 allows the stud 202 to remain in the channel 199 for clockwise rotations of the cam 157. In turn, the step in the interchange area allows the stud 202 to pass from the channel 199 to the ramp 201 when the stud 202 is in the interchange area and the cam 157 rotates in the counter-clockwise direction.

The cam follower lever 203 is fixed on the shaft 168 and comprises a lever with a finger 206 capable of interacting with a fin 207 of the rocker arm 192. A second lever 208 is fixed on the shaft 168 and comprises a second lever with a finger 209 capable of interacting with a fin 211 of the rocker arm 193.

In the rest state of the cam 158, the stud 202 is in a position "7" of the channel 199. Consequently, the cam follower lever 203 and the second lever 208 are in a rest position in which the levers with fingers 206 and 209 are engaged with the fins 207 and 211 of the rocker arms 192 and 193 against the action of the springs 197 and 198 and in which the pressure rollers 88 and 89 are in the rest position, disengaged from the rollers 80 and 85 respectively.

COPY COLLECTION STATION

In the collection station 41, the guide fins 66 and 67 of the frame 64 are movable between a rest position and an operating position. In the rest position, the fins 66 and 67 are aligned with the rollers 80 and 85 respectively to receive the last printed sheet and keep it raised with respect to the sheets housed in the case 197. In the operating position, the fins 66 and 67 move away from each other, while remaining in the same horizontal plane, so that one approaches the left-hand support 34 and the other approaches the right-hand support 36, in such a way that the last printed sheet falls by gravity into the case 197. By means of studs 216, 217, each fin 66, 67 is supported by two arms 203 and 204, 206 and 207 which are rotatable on vertical studs 218 and 219, 221 and 222 of the chassis 33. A spring 223, 224 retains the corresponding fin 66, 67 in the rest position.

The opening mechanism 87 comprises a first extension 226 projecting downwards from the cam follower lever 203 and a second extension 227 projecting downwards from the lever 208. The extension 226 is capable of interacting with a shoulder 228 of the arm 203 connected to the fin 66 and the extension 227 is capable of interacting with a shoulder 229 of the arm 206.

The motor 84 causes the double cam 153 to rotate in the counter-clockwise direction from the rest position "7". The second cam 158 rotates and moves the stud 202 from the rest position "7" to an operating position "8" of intermediate raising on the ramp 201 and to an operating position "9" on the ramp 201 of minimum raising. Conversely, when it rotates in the clockwise direction, it moves the stud 202 from the operating position "9" to the operating position "8" and to the rest position "7".

When the cam 158 moves the stud 202 to the operating position "8" of the ramp 201, it causes the cam follower lever 203 and the second lever 208 to rotate in the clockwise direction. With this rotation, the levers with fingers 206 and 209 are disengaged from the fins 207 and 211 respectively. At the same time, the extensions 226 and 227 are positioned adjacent to the shoulders 228 and 229, and the springs 197 and 198 cause the rocker arms 192 and 193 respectively to rotate in the counter-clockwise direction, bringing the pressure rollers 88 and 89 into the operating positions on a sheet 50 supported on the teeth of the rollers 85 and 186.

If the second cam 158 is made to rotate further in the counter-clockwise direction, the stud 202 is positioned in the operating position "9" of the ramp 201 and causes the cam follower lever 203 and the second lever 208 to rotate further in the clockwise direction. The extensions 226 and 227 engage with the shoulders 228 and 229 respectively and cause the fin 66 to rotate in the clockwise direction and cause the fin 67 to rotate in the counter-clockwise direction, positioning them in the operating positions against the action of the springs 223 and 224.

If the cam 158 is now made to rotate in the clockwise direction, the stud 202 is positioned in the operating position "8" of the ramp 201 and causes the cam follower lever 203 with the second lever 208 to rotate in the counter-clockwise direction. With this rotation, the extensions 226 and 227 are disengaged from the shoulders 228 and 229 respectively and allow the springs 223 and 224 to return the fins 66 and 67 respectively to the rest positions. At the same time, the levers with fingers 206 and 209 are positioned adjacent to the fins 207 and 211 respectively of the rocker arms 192 and 193.

If the cam 158 continues to rotate in the clockwise direction, the stud 202 is positioned in the rest position "7" of the channel 199 and causes the cam follower lever 203 with the second lever 208 to rotate further in the counter-clockwise direction. With this rotation, the levers with fingers 206 and 209 engage with the fins 207 and 211 respectively, causing the rocker arms 192 and 193 respectively to rotate in the clockwise direction against the action of the springs 197 and 198, and return the pressure rollers 88 and 89 to their rest positions in which they are disengaged from the rollers 85 and 186.

The reciprocal effect of the rotations of the first cam 157 and of the second cam 158 is as follows. When the cam 157 rotates in the clockwise direction to move the stud 164 of the cam follower lever 166 from the rest position "3" to the operating position "2" and then to the position "1", the second cam 158 rotates in the clockwise direction and causes the stud 202 to travel along a path leading from the rest position "7" to positions "10" and "11" in the constant maximum raising channel 199. The cam follower lever 203 therefore remains in the rest position and there is no movement of the extractor mechanism 82 or of the frame 64.

Even when the first cam 157 is rotated through more than one revolution in the clockwise direction, from the position in which the stud 164 is in the operating position "1" to actuate the pump 85, the second cam 158 has no effect on the stud 202, owing to the concentricity of the channel 199 and the fact that the area of interchange between the channel 199 and the ramp 201 is passed through in the direction of the descending step, neutralised by the spring acting on the stud 202. In clockwise rotations starting from positions "7", "10" or "11", the cam 157 therefore does not actuate the cam follower lever 203 and the corresponding mechanisms.

When the second cam 158 rotates in the anti-clockwise direction to move the stud 202 from the rest position "7" to the operating positions "8" and "9", to actuate the extractor mechanism 82 or to open the frame 64, the first cam 157 also rotates in the anti-clockwise direction. The stud 164 of the cam follower lever 166 passes from the rest position "3" to the positions "4", "5", and "6", which are concentric with the rest position "3", and consequently there is no movement of the cam follower lever 166. When the second cam 158 rotates in the clockwise direction to move the stud 202 of the cam follower lever 203 from the positions "9" and "8" to the rest position "7", the first cam 157 rotates in the clockwise direction and the stud 164 travels along the concentric minimum raising channel 159 from the positions indicated by "5" and "4" to the rest position "3".

The operation of the extraction mechanism 82 and of the opening mechanism 87 is as follows. When a copy sheet 50 is next to the printing line 59 and the printing head 54 is printing on the sheet 50, the electronic controller 46 sends a set of sequential and synchronised pulses to the D.C. motor 62, to the head 54, and to the motors 53 and 84. The D.C. motor 62 causes the carriage 56 to move with the head 54 which prints along the printing line 59 for the printing of twenty-five scanning lines. In particular, after the printing of the last column of dots, the stepper motor 53 initiates a line feed cycle through the rollers 107 and 112, 111 and 113, and the sheet 50 is made to advance by 4.2 mm, corresponding to the twenty-five scanning rows. During the line feed movements, the sensor 124 signals the presence of paper and the sheet 50, running over the toothed rollers 80 and 85, is supported on the fins 66 and 67 which are in the rest position.

When the sensor 124 signals the passage of the trailing edge, at the bottom margin, the electronic controller 46 interrupts the line feed movement in progress and activates the motor 84 to cause the second cam 158 to rotate in the counter-clockwise direction, positioning the stud 202 in the operating position "8". The pressure rollers 88 and 89 are brought to the operating position and hold the side margins of the sheet 50 against the rollers 80 and 85. When the rollers 88 and 89 are in the operating position, the electronic controller 46 causes the previously interrupted line feed movement to be completed. At this point the electronic controller 46 checks the data selected by the operator, before initiating printing and a line feed cycle.

If the operator has set the machine to print close to the bottom margin, then when the sheet has cleared the advance rollers 111 and 113 the electronic controller again controls the scanning and printing, of the head 54 and of the line feed device to make the sheet advance and print on the edges adjacent to the trailing edge of the sheet.

When the head has finished the final printing run, the electronic controller 46 causes the copy sheet 50 to be expelled by making the second cam 158 rotate in the counter-clockwise direction. The stud 202 is therefore moved into the operating position "9". The cam follower lever 203 and the second lever 208, with the fins 207 and 211, cause the corresponding guide fins 66 and 67 to rotate, positioning them in the operating positions in which they are disengaged from the sheet 50. The motor 53 then actuates a line feed cycle so that the rollers 80 and 85 and the pressure rollers 88 and 89 make the sheet advance and release it from their grip, so that the sheet can be placed in the collection case 197.

RESETTING DEVICE

For the initialisation of the machine 31, a resetting device 231 for the stepper motor 84 comprises a tooth 232 which projects from the second cam 158 and can interact with a shoulder 233 fixed on the cam follower lever 203. Whenever the facsimile machine 31 is switched on, the electronic controller 46 sends a set of pulses to the motor 84 which causes the second cam 158 with the tooth 232 to rotate in the anti-clockwise direction. The stud 202 is moved from the rest position 7 to a resetting position 12 which is concentric with position 9 in which the cam follower lever 203 and the second lever 208 have positioned the fins 66 and 67 in their operating positions and the shoulder 233 is on the path of the tooth 232. The resetting position 12 follows the operating position "9", so that, during the normal operation of the mechanism 87, the tooth 232 never engages with the shoulder 233. After rotating through approximately 180°, the tooth 232 engages with the shoulder 233 and the second cam 158 is stopped. The electronic controller 46 records the angular position reached by the stepper motor 84, which will be the resetting position. The second cam 158 is then made to rotate in the clockwise direction and the stud 202 is returned to the rest position 7 with the various lever mechanisms.

SCANNING DEVICE

In the scanner 43 (FIGS. 1 and 2), the motor 78 is fixed on the right-hand support 36 of the chassis 33. The motor 78 is of the stepper type and, through a pinion 242, causes the rotation of a set of gears 243 and a toothed belt 244 which drive a set of rollers 246, 247, 248 and 249 to make the original sheet 50 advance from the aperture 74 to the exit aperture 81. Sensors 253 and 254 signal the presence of paper and the format, A4, B4 or A3, to the electronic controller 46. The roller 247 acts as a picker when more than one sheet is inserted at the same time. The illuminator 79, a set of mirrors 257, 258 and 259, and a lens 261 interact to send the analog signals to a CCD reader 262. A white calibration strip 263 interacts with the illuminator 79 to store the white values in the CCD reader 262.

The scanner 43 can transmit the data directly to the line or to a personal computer through the electronic controller 46, which sends a set of pulses to the stepper motor 78 which makes the pinion 242 rotate. The gears 243, the belt 244 and the rollers 246, 247, 248 and 249 rotate with the pinion 242. The sheet 50 is made to advance until it is positioned between the illuminator 79 and the calibration strip 263. Through the mirrors 257, 258 and 259 and the lens 261, the light signals arrive at the CCD reader 262 which converts them into electrical signals which are sent to the electronic controller 46 to be stored and then transmitted to the line or to a personal computer.

The upper part of the housing 32 has the profile of a cylindrical sector. It is suitably joined to a plate 264 of complementary shape, pivoted on a front edge of the housing so that it can assume a closed or an open position. In the closed position, the plate 264 covers the keys 44 and extends across the whole width of the machine 31 approximately up to the transverse aperture 74. In the open position, the plate 264 is in alignment with the aperture 81 of the station 42 and forms a tray capable of collecting the original sheets 77 emerging from the aperture 74 after they have been scanned.

An additional piece 266 is also pivoted on one side of the plate 264 at its rear edge, and is also in the shape of a cylindrical sector; in its closed position it lies on one part of the plate 264 and is locked to it. When the plate 264 is in its open position, the additional piece 266 is released from the plate 264 and is aligned with the plate, by means of stops between the plate and the additional piece bearing on both parts, and forms an extension of the plate itself.

The upper part of the housing 19 has the profile of a cylindrical sector. It is suitably joined to a plate 264 of complementary shape, pivoted on a front edge of the housing so that it can assume a closed or an open position. In the closed position, the plate 264 covers the keys 31 and extends across the whole width of the machine 18, nearly up to the transverse aperture 251. In the open position, the plate 264 is in alignment with the exit aperture 252 of the station 30 and forms a tray capable of collecting the original sheets 45 emerging from the aperture 251 after they have been scanned.

An additional piece 266 is also pivoted on one side of the plate 264 at its rear edge, and is also in the shape of a cylindrical sector; in its closed position it lies on one part of the plate 264 and is locked to it. When the plate 264 is in its open position, the additional piece 266 is released from the plate 264 and is aligned with the plate, by means of stops between the plate and the additional piece bearing on both parts, and forms an extension of the plate itself.

ELECTRONIC CONTROLLER

The electronic controller 46 comprises a board 271 housed in a container substantially in the form of a parallelepiped, disposed behind the case 49 and parallel to it.

The controller 46 comprises a central processing unit (CPU) 272, of a known type, for example the V53 model made by NEC, a special circuit (ASIC) 273, a microprocessor 274, for example of the 78312 type, for the control of the head 91 and of particular functions of the machine, volatile memories (DRAM) 276 and non-volatile memories (EPROM) 277, and a group of circuits 278 for controlling the various motors.

The control unit 272 operates as master processor for the machine 31, whilst the processor 274 is a slave. There are provided, as peripheral units:

1) Motor actuating circuits 281 and 282, of the type 3717 and L6202 and included in the circuits 278, for driving the stepping motors 53, 78 and 84 and the D.C. motor 62, respectively;

2) An Image Processor 283, of a known type, for processing signals for the CCD reader 262;

3) A Modem 284 for the connection with telephone lines 290 and the control of line tones;

4) A generic Input/output unit 285 for controlling the line interface and the modem 284; and 5) An Universal Asynchronous Receiving Transmitting unit (UART) 286 for connections with further units, for example a Personal Computer, via a serial RS 232 port.

Figure 20:
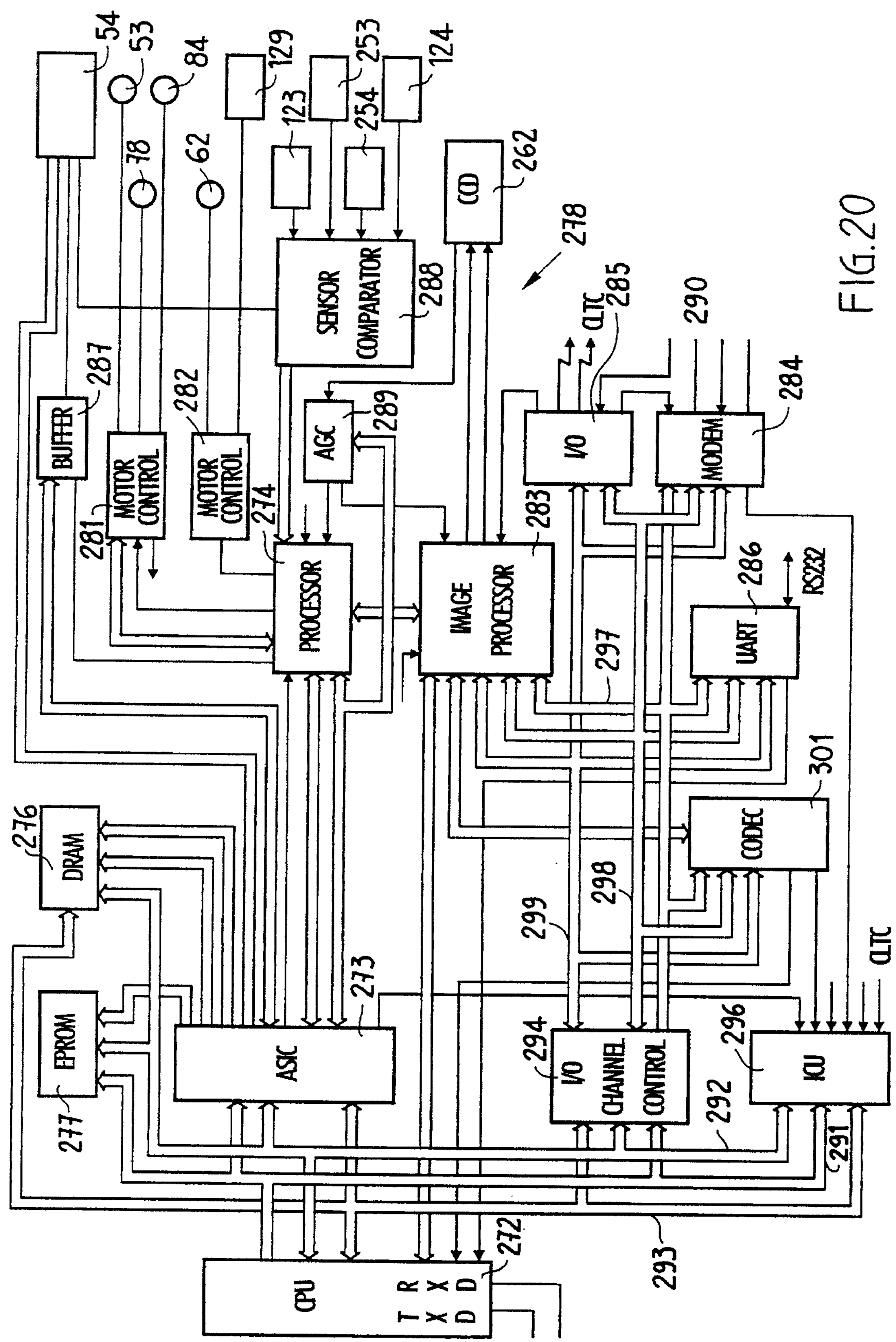
FIG. 20 is a logical block diagram of a monitoring and control unit of the machine shown in FIG. 1.

To the central unit 272 are also associated a 33 Mhz oscillator, reset drivers, an interrupt controller, a controller for a direct access to memory (DMA) and further ancillary circuits not shown in FIG. 20.

Specific circuits either for the control of the printing head 54 and for the control of the machine 31 are provided in the ASIC circuit 273. Inter alia, the circuit 273 controls the "refresh" function of the volatile memories 276 and generates "wait" state functions for the CPU 272. The circuit 273 interfaces the microprocessors 272 and 274, decodes addresses for the accesses to the memories 276 and controls the accesses to DMA. The controls of the nozzles in the head 54 occurs through a buffer circuit 287.

The slave microprocessor 274 comprises a CPU portion, a ROM portion and a RAM portion. Its ROM portion comprises the specific programs for performing the various features connected to the movements of the printing head, the line feed device, extraction mechanism and the opening mechanism of the copy holding frame. Moreover the ROM portion of the microprocessor 274 provides to the initialisation of the motors 53, 62, 78 and 84 and their selective rotations according to the functions to be performed.

The image processor 283 provides to special functions of the machine 31, as shading correction, laplacia filtering, dithering, adaptative binarization, error diffusion and image separation.

A comparator circuit 288 compares the signals from the sensors 123, 124, 253 and 254 with reference signals and generates corresponding switch signal for the microprocessor 274. The microprocessor 274 feeds the actuating circuits 281 and 282 and controls an Automatic Gain Control (AGC) circuit 289 for control of the video signals from the CCD reader 262.

The CPU 272 is interconnected with the memories 276 and 277 and the ASIC circuit 273 via an address bus 291, a data bus 292 and a control bus 293. There are also provided an Input/Output Channel Control circuit 294 and an Interrupt Control Unit (ICU) circuit 296 associated to the ASIC circuit 273, also connected with the buses 291, 292 and 293.

An address bus 297, a data bus 298 and a control bus 299 connect the I/O Control circuit 294 with the image processor 283, the modem 284, the I/O port 285 and the UART circuit 286. A Coding/Decoding circuit 301 is connected to the buses 297, 298 and 299 and the image processor 283 for coding and decoding functions for the processor 274.

The circuit 294 decodes input/output address and includes buffer separated for the signals of the data bus generated by external peripheral units and the signals of the data bus generated by internal units, and the ICU unit 295 provides to define interrupt signals for the CPU 272.

What is claimed is:

1. A plain paper cut sheet facsimile apparatus comprising:

scanning means for scanning an original document and producing first data signals representing the document;

transmitting means for transmitting said first data signals over a telephone line to a receiver;

receiving means for receiving second data signals from a transmitter over said telephone line;

recording means for recording said received second data signals on a sheet of paper; wherein said recording means includes:

an ink jet printing head movable along a printing line for performing recording on said sheet, said sheet having a leading edge and a trailing edge;

a line feeding device, mounted upstream of said printing line, for advancing said sheet incrementally in front of said print line;

a sheet extraction mechanism, mounted downstream of said printing line, for advancing said sheet incrementally past said print line, said sheet extraction mechanism comprising at least one rubber roller selectively engageable with a pressure roller having fine external teeth, when said trailing edge of said sheet reaches a reference position with respect to said printing line;

a reversible stepper motor incrementally rotating in a clockwise direction and in a counter-clockwise direction;

an actuating mechanism responsive to said counter-clockwise direction of said motor to engage said pressure roller with said at least one rubber roller, and responsive to said clockwise direction of said motor to disengage said pressure roller from said at least one rubber roller.

2. A plain paper cut sheet facsimile apparatus according to claim 1, in which said actuating mechanism comprises:

cam means including a first cam profile having a maximum raising channel and a second cam profile connected to said first profile through an interchange area and having a minimum raising area;

cam follower means cooperating with said first and second cam profile and with said pressure roller for selectively engaging said pressure roller with said at least one rubber roller, said cam follower means following said first profile when said cam means rotate in said clockwise direction, and following said second profile when said cam means rotate in said counter-clockwise direction, whereby said cam follower means engage said pressure roller with said at least one rubber roller when said cam means rotate in said counter-clockwise direction, and said cam follower means disengage said pressure roller from said at least one rubber roller when said cam means rotate in said clockwise direction.

3. A plain paper cut sheet facsimile apparatus according to claim 1, further comprising control means for initializing and controlling said reversible stepper motor;

wherein said control means lock said motor in a preferential phase after a predetermined period of rotation at low speed.

* * * * *